(12) United States Patent
Olivier et al.

(10) Patent No.: US 6,935,191 B2
(45) Date of Patent: Aug. 30, 2005

(54) FUEL DISPENSER FUEL FLOW METER DEVICE, SYSTEM AND METHOD

(75) Inventors: Paul D. Olivier, Scottsdale, AZ (US); William P. Shermer, Greensboro, NC (US); Seifollah S. Nanaji, Greensboro, NC (US)

(73) Assignees: Gilbarco Inc., Greensboro, NC (US); Exact Flow, LLC, Scottsdale, AZ (US)

( * ) Notice: Subject to any disclaimer, the term of this patent is extended or adjusted under 35 U.S.C. 154(b) by 135 days.

(21) Appl. No.: 10/634,137

(22) Filed: Aug. 4, 2003

(65) Prior Publication Data

US 2005/0028610 A1 Feb. 10, 2005

(51) Int. Cl.[7] .............................. G01F 1/05; B67D 5/08
(52) U.S. Cl. ............................... 73/861.79; 73/861.75; 222/52; 222/63; 702/45
(58) Field of Search ................... 73/861.79, 861.74, 73/861.75, 861.77, 861.78; 222/52, 63; 702/45

(56) References Cited

U.S. PATENT DOCUMENTS

| 2,678,658 | A | 5/1954 | Rittenhouse | 137/235 |
|---|---|---|---|---|
| 2,773,251 | A | 12/1956 | Snyder | 137/487.5 |
| 3,524,465 | A | 8/1970 | Sadler | 137/115 |

(Continued)

FOREIGN PATENT DOCUMENTS

| DE | 698486 C | 11/1940 |
|---|---|---|
| DE | 19714587 C | 5/1998 |
| EP | 0391806 | 10/1990 |
| FR | 2504907 | 11/1982 |
| FR | 2527195 | 11/1983 |
| GB | 2141828 A | 1/1985 |
| WO | WO 99/32394 | 7/1999 |

OTHER PUBLICATIONS

"Standard for Safety", Power–Operated Pumps for Petroleum Product Dispensing Systems, UL 79, Underwriters Laboratories, Feb. 23, 1981, p. 8.

"Standard for Safety", Power–Operated Pumps for Petroleum Product Dispensing Systems, UL 87, Underwriters Laboratories, Sep. 24, 1990, pp. 9–10.

*Primary Examiner*—Harshad Patel
(74) *Attorney, Agent, or Firm*—Withrow & Terranova, PLLC

(57) ABSTRACT

A flow switch used on conjunction with a fuel flow meter in a fuel dispenser to determine when fuel flow rate signals form a fuel flow meter should be ignored in the calculation of flow rate and/or volume of fuel dispensed. An inferential fuel flow meter may be used as the fuel flow meter. The inferential fuel flow meter may be a turbine flow meter that comprises one or more turbine rotors that rotate in response to fuel flow flowing through the turbine flow meter. The turbine rotors may continue to generate pulses even when fuel is no longer flowing. A flow switch determines when fuel is actually flowing and fuel is not actually flowing. The flow switch is described as either a single poppet or dual poppet flow switch in examples described herein.

73 Claims, 17 Drawing Sheets

U.S. PATENT DOCUMENTS

| | | | |
|---|---|---|---|
| 3,724,808 A * | 4/1973 | Sugden, Jr. | 222/20 |
| 3,761,567 A | 9/1973 | Parsons | 423/175 |
| 4,244,396 A | 1/1981 | Friedland et al. | 137/487.5 |
| 4,343,336 A | 8/1982 | Trygg | 141/218 |
| 4,397,405 A | 8/1983 | Batson | 222/14 |
| 4,487,238 A | 12/1984 | Carder, Sr. | 141/206 |
| 4,559,982 A | 12/1985 | Fink, Jr. | 141/206 |
| 4,573,346 A | 3/1986 | Zacharias, Jr. | 73/61.1 R |
| 4,978,029 A | 12/1990 | Furrow et al. | 222/1 |
| 4,986,445 A * | 1/1991 | Young et al. | 222/71 |
| 4,987,029 A * | 1/1991 | Wagner et al. | 428/319.3 |
| 5,036,710 A | 8/1991 | King | 73/861.04 |
| 5,162,624 A | 11/1992 | Duksa | 200/81.9 M |
| 5,178,197 A | 1/1993 | Healy | 141/217 |
| 5,225,641 A | 7/1993 | Weld et al. | 200/81.9 R |
| 5,228,594 A | 7/1993 | Aslin | 222/63 |
| 5,303,842 A | 4/1994 | Harp et al. | 220/562 |
| 5,421,545 A | 6/1995 | Schexnayder | 251/30.02 |
| 5,689,071 A * | 11/1997 | Ruffner et al. | 73/861.84 |
| 5,717,564 A * | 2/1998 | Lindale | 361/600 |
| 5,831,176 A | 11/1998 | Morgenthale et al. | 73/861.77 |
| 5,934,507 A * | 8/1999 | Motosugi | 73/861.77 |
| 5,954,080 A * | 9/1999 | Leatherman | 137/14 |
| 6,000,423 A | 12/1999 | Roloson et al. | 137/334 |
| 6,173,734 B1 | 1/2001 | Olivas et al. | 137/460 |
| 6,227,409 B1 | 5/2001 | Brown | 222/1 |
| 6,240,943 B1 | 6/2001 | Smith | 137/1 |
| 6,382,246 B2 | 5/2002 | Mori et al. | 137/554 |
| 6,412,510 B1 | 7/2002 | Johnson | 137/14 |
| 6,435,204 B2 * | 8/2002 | White et al. | 137/234.6 |
| 6,575,206 B2 * | 6/2003 | Struthers et al. | 141/94 |
| 6,651,517 B1 | 11/2003 | Olivier | 73/861.79 |
| 6,692,535 B2 | 2/2004 | Olivier | 73/861 |
| 6,763,974 B1 * | 7/2004 | Shermer et al. | 222/40 |

* cited by examiner

US 6,935,191 B2

FUEL DISPENSER FUEL FLOW METER DEVICE, SYSTEM AND METHOD

FIELD OF THE INVENTION

The present invention relates to a device, system and method for determining accurately the volume of fuel flow dispensed by a fuel dispenser.

BACKGROUND OF THE INVENTION

In a typical transaction, a consumer may drive a vehicle up to a fuel dispenser in a fueling environment. The consumer arranges for payment, either by paying at the pump, paying the cashier with cash, using a credit card or debit card, or some combination of these methods. The nozzle is inserted into the fill neck of the vehicle, and fuel is dispensed into the gas tank of the vehicle. Displays on the fuel dispenser display how much fuel has been dispensed as well as a dollar value associated with the fuel that has been dispensed. The customer relies on the fuel dispenser to measure the amount of fuel dispensed accurately and charge the customer accordingly. One method customers sometimes use to control costs is to pay for a preset amount of fuel based on a dollar or volume amount, called a "pre-pay". Regulatory requirements, namely Weights & Measures, require that these customers receive all of the fuel for which they have paid to a highly accurate degree.

Operating behind the scenes of this process are valves that open and close the fuel flow path and a flow meter that measures the amount of fuel dispensed inside the fuel dispenser. The purpose of the flow meter is to measure accurately the amount of fuel being delivered to the customer's vehicle so that the customer may be billed accordingly and fuel inventory tracking may be undertaken. As noted, for preset dollar or volume transactions (pre-pays), the fuel dispenser relies on the flow meter to measure the fuel dispensed so as to know when to terminate the fuel flow.

Some fuel dispenser fuel flow meters are inferential meters, meaning that the actual displacement of the fuel is not measured. Inferential meters have some advantages over positive displacement meters. Chief among these advantages is that inferential meters typically are smaller than positive displacement meters. One example of an inferential meter that may be used is described in U.S. Pat. No. 5,689,071, entitled "WIDE RANGE, HIGH ACCURACY FLOW METER." The '071 patent describes a turbine flow meter that measures the flow rate of a fluid by determining the number of rotations of turbine rotors located inside the flow path of the meter.

As fluid enters the inlet port of the turbine flow meter in the '071 patent, the fluid passes across two turbine rotors, which causes the turbine rotors to rotate. The rotational velocity of the turbine rotors is sensed by pick-off coils. The pick-off coils are excited by an alternating current signal that produces a magnetic field. As the turbine rotors rotate, the vanes on the turbine rotors pass through the magnetic field generated by the pick-off coils, thereby superimposing a pulse on the carrier waveform of the pick-off coils. The superimposed pulses occur at a repetition rate (pulses per second) proportional to the rotors' velocity and hence proportional to the measured rate of flow.

A problem may occur when using a turbine flow meter to measure fuel in a retail fuel dispenser. When fuel flows across the rotors, the rotors acquire rotational momentum. When the fuel flow stops, the rotational momentum causes the turbine rotors to continue to rotate for a period of time thereafter despite the absence of fuel flow. This continued movement causes the turbine flow meter to continue generating measurement signals as if fuel were still flowing. The control system that receives the measurement signals from the pick-off coils of the turbine flow meter continues to register fuel flow falsely.

Therefore, a need exists for a fuel dispenser to measure accurately fuel flow with a fuel flow meter that continues to generate measurement signals even after fuel flow has stopped.

SUMMARY OF THE INVENTION

The present invention is directed to a flow switch that operates in a fuel dispenser to detect and communicate when fuel is flowing in the fuel dispenser and being delivered to a vehicle. For certain types of fuel flow meters used in fuel dispensers, the flow meter may continue to indicate a signal or indicia indicative of fuel flow after fuel flow has stopped. In this manner, a fuel dispenser will continue to operate as if fuel is being dispensed to a customer's vehicle when fuel has indeed stopped. This will cause the number of gallons dispensed as well as the price charged to the customer for such fuel to be inaccurate. Therefore, the present invention is directed to a device, system, and method to accurately measure fuel flow in a fuel dispenser by determining when fuel flow has stopped in the event that the fuel flow meter continues to indicate fuel flow.

In one embodiment of the present invention, the fuel flow meter of the fuel dispenser is a turbine flow meter like that described in the '071 Patent referenced in the Background of the Invention. After fuel exits the shear valve in the fuel dispenser, the fuel enters the fuel flow meter. A flow switch is located downstream of the fuel flow meter so that a control system in the fuel dispenser has knowledge of when fuel flow is actually occurring in the fuel dispenser and when it is not. Alternatively, the flow switch could be located on the inlet side of the fuel flow meter either proximate to the fuel flow meter or before other components on the inlet side of the fuel flow meter.

The flow switch may be comprised of a housing, within which the components and various elements of the flow switch are located, and also to create a fuel flow path for fuel to flow from the fuel flow meter. As fuel enters the flow switch, the fuel may first encounter an optional flow straightener. After fuel exits the flow straightener, the fuel encounters a valve in the flow switch that moves in response to the force of the fuel. The flow switch includes a signaling means to inform the control system when fuel is flowing and when fuel is not flowing. The control system can ignore fuel flow pulse signals from the fuel flow meter as part of the calculation of the flow rate and/or volume of fuel being dispensed when the flow switch indicates that fuel is not flowing.

In one embodiment of the present invention, the flow switch is a single poppet valve that is incorporated into a flow switch housing. The poppet valve contains a spring to form a spring-loaded housing such that the force of fuel flow applies pressure to the spring and causes an indicator or sensor coupled to the poppet valve to generate a signal over a sensor communication line to the control system. In this manner, the control system detects when fuel is flowing through the flow switch for the purposes of accurately measuring the flow rate and/or volume of fuel flow. In exemplary embodiments, the indicator may be a Hall Effect sensor, an ultrasonic sensor, a magnetic reed switch, or the like, so as to help track the movement of the poppet. After the fuel flow exits flow switch, the fuel flow may encounter an additional optional flow straightener as was previously described. After the fuel exits the flow switch, the fuel is eventually dispensed to a hose and nozzle and onto a vehicle. The valve can also acts as a check valve to allow fuel to only flow in one direction thereby preventing backflow.

In another embodiment, a dual piston/poppet is used as the flow switch. The dual piston/poppet acts as a valve and includes two poppets to handle both slow fuel flow and high fuel flow conditions in the fuel dispenser to accurately determine when fuel is flowing and when fuel is not flowing. A single poppet flow switch may not be able to properly determine when fuel is flowing and when fuel is not flowing for both slow fuel flow and high fuel flow conditions. Slow fuel flow conditions exist at the beginning of a dispensing transaction and when the fuel dispenser slows down fuel delivery during a pre-pay transaction to deliver an exact amount of fuel according to the amount of the pre-pay. This alternative valve also acts as a check valve.

The dual piston/poppet valve operates in one of three modes. The first mode is the fully closed mode where both pistons are closed and no fuel flows through the valve. The second mode is a slow flow open mode. In this mode, a secondary or bypass fuel path is open and fuel flows relatively slowly through the valve. The indicator, if present, tells the control system that the bypass fuel path is open and thus, the control system knows to accept inputs from the flow meter as non-spurious. The third mode is a high flow open mode. In this mode, a primary fuel path is open concurrently with the secondary fuel path, and fuel flows quickly through the valve. Because the secondary fuel path is open, the indicator, if present, tells the control system to accept input from the flow meter. The two-fuel path arrangement helps optimize the valve for use with an inferential flow meter in slow flow and high flow situations regardless of the existence of the indicator. The indicator helps the control system of the fuel dispenser know when to accept inputs from the flow meter.

The valve has a housing with a primary fuel flow path on a primary axis of the housing. The primary fuel flow path is blocked by a normally closed primary piston. The primary piston is kept normally closed by a primary spring. A secondary fuel flow path routes around the primary piston. The secondary fuel flow path is blocked by a normally closed secondary piston. The secondary piston is likewise kept normally closed by a secondary spring. The force required to open the secondary piston is comparatively less than that required to open the primary piston. The secondary piston is also connected to a magnet or other position sensible element that acts as the indicator such that movements of the secondary piston may be detected.

In use, the valve initially receives fuel at a slow rate. This fuel hits the primary piston and is blocked. The fuel is thus shunted into the secondary fuel flow path where the fuel encounters the secondary piston. The secondary spring on the secondary piston is weak enough such that the slow rate of fuel is sufficient to compress the secondary spring, thereby opening the secondary fuel flow path. Opening the secondary piston moves the position sensible element such that a sensor may detect the movement of the position sensible element. The rate of fuel flow increases until the pressure on the primary piston is enough to compress the primary spring, thereby opening the primary fuel flow path. Fuel then flows through both the primary fuel path and the secondary fuel path during the majority of the fueling transaction.

As the fueling transaction ends, the process is reversed. The fuel flow rate slows, lowering the pressure on the primary piston. The primary spring closes the primary piston, leaving the secondary fuel path open. When the fuel flow is terminated, such as at the end of the transaction, the pressure on the secondary piston abates, and the secondary spring closes the secondary piston. The closing of the secondary piston moves the position sensible element, and the control system is informed to ignore further signals from the flow meter. Even when fuel flow is terminated abruptly and both pistons close at the same time, the movement of the position sensible element informs the control system to ignore further signals from the flow meter.

In exemplary embodiments, the indicator may be a Hall-Effect sensor, an ultrasonic sensor, a magnetic reed switch, or the like, so as to help track the movement of the secondary piston. Flow straigteners may also be included on both the inlet and/or outlet sides of the dual poppet valve flow switch.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is directed to a flow switch that operates in a fuel dispenser to detect and communicate when fuel is flowing in the fuel dispenser and being delivered to a vehicle. For certain types of fuel flow meters used in fuel dispensers, the flow meter may continue to indicate a signal or indicia indicative of fuel flow after fuel flow has stopped. In this manner, a fuel dispenser will continue to operate as if fuel is being dispensed to a customer's vehicle when fuel has indeed stopped. This will cause the number of gallons dispensed as well as the price charged to the customer for such fuel to be inaccurate. Therefore, the present invention is directed to a device, system, and method to accurately measure fuel flow in a fuel dispenser by determining when fuel flow has stopped in the event that the fuel flow meter continues to indicate fuel flow. In the main embodiment of the present invention, a turbine flow meter is described as the fuel flow meter of the fuel dispenser. A discussion of the fuel flow meter in combination with a flow switch according to the invention is discussed beginning at FIG. 5 below. Before these aspects of the present invention are described, some background information of typical fuel dispensers and their components is described first as illustrated in FIGS. 1–4.

Figure 1:
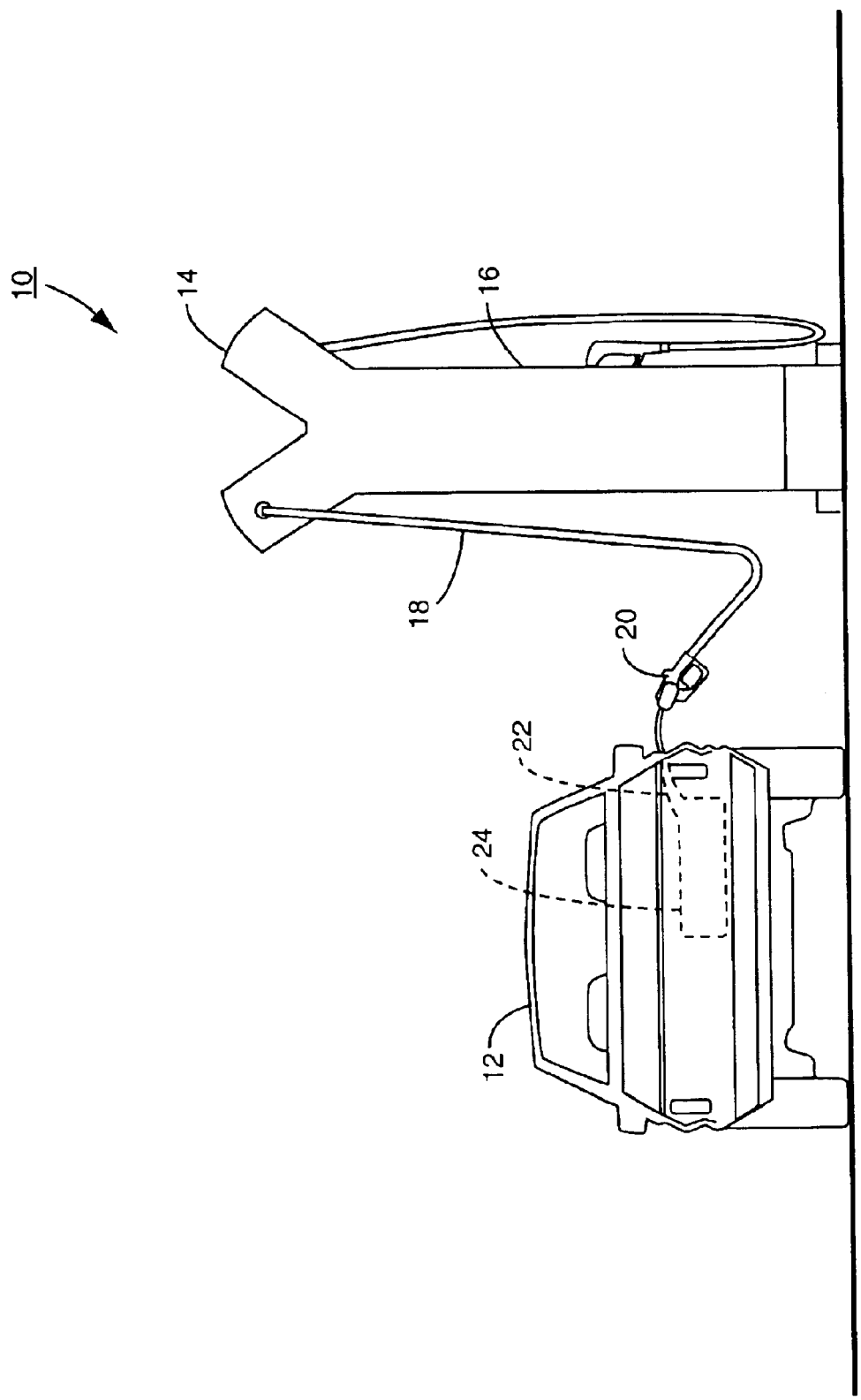
FIG. 1 illustrates a fuel dispenser involved in a fueling transaction in the prior art.

FIG. 1 illustrates a typical fueling environment 10 with a vehicle 12 being fueled by a fuel dispenser 14. The fuel dispenser 14 includes a housing 16 with a hose 18 extending therefrom. The hose 18 terminates in a manually operated nozzle 20 adapted to be inserted into a fill neck 22 of the vehicle 12. Fuel flows from an underground storage tank (UST) (not illustrated) through the fuel dispenser 14, out through the hose 18, down the fill neck 22 to a fuel tank 24 of the vehicle 12 as is well understood. The fuel dispenser 14 may be the ECLIPSE® or ENCORE® sold by assignee of the present invention or other fuel dispensers as needed or desired such as that embodied in U.S. Pat. No. 4,978,029, which is hereby incorporated by reference in its entirety.

Figure 2:
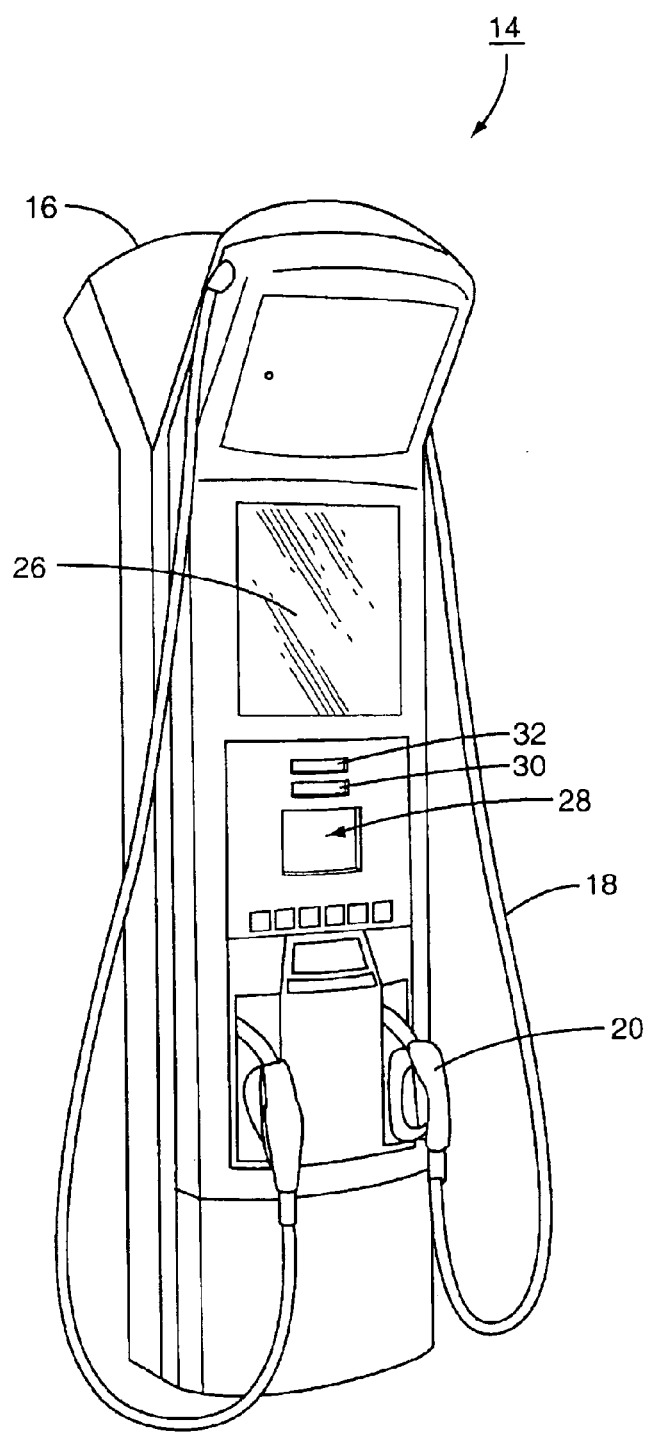
FIG. 2 illustrates a partial front view of a fuel dispenser in the prior art.

The front of the fuel dispenser 14 is illustrated in FIG. 2. The fuel dispenser 14 may have an advertising display 26 proximate the top of the housing 16 and a video display 28 at eye level. The video display 28 may be the Infoscreen® manufactured and sold by Gilbarco Inc. The video display 28 may be associated with auxiliary information displays relating to an ongoing fuel transaction that includes the number of gallons of fuel dispensed displayed on a gallons display 30, and the price of such fuel dispensed on a price display 32. The displays 26, 28, 30, 32 may include the capability of displaying streaming video and may include liquid crystal displays (LCDs) as needed or desired.

The present invention is well suited for use inside the housing 16 of a fuel dispenser 14. Specifically, the present invention is well suited for positioning in the fuel path of the fuel dispenser 14 as better illustrated in FIG. 3. Fuel may travel from the UST (not illustrated) via a fuel pipe 36, which may be a double-walled pipe. An exemplary underground fuel delivery system is illustrated in U.S. Pat. No. 6,435,204, which is hereby incorporated by reference in its entirety. The fuel pipe 36 may pass into the housing 16 first through a shear valve 38. The shear valve 38 is designed to cut off fuel flowing through the fuel pipe 36 if the fuel dispenser 14 is impacted, as is commonly known in the industry. One illustration of a shear valve 38 is disclosed in U.S. Pat. No. 6,575,206, which is hereby incorporated by reference in its entirety.

In most fuel dispensers 14, a submersible turbine pump (STP) (not illustrated) associated with the UST is used to pump fuel to the fuel dispenser 14. Some fuel dispensers 14 may be self-contained, meaning fuel is drawn to the fuel dispenser 14 by a pump controlled by a motor (neither shown) positioned within the housing 16. A valve 40 may be positioned upstream of a fuel flow meter 52. Alternatively, the valve 40 may be positioned downstream of the flow meter 52 (see FIG. 4). The fuel flow meter 52 and valve 40 are positioned in a fuel handling compartment 44 of the housing 16, as is well understood. The fuel handling compartment 44 is isolated from an electronics compartment 46 located above a vapor barrier 42. The fuel handling compartment 44 is isolated from any sparks or other events that may cause combustion of fuel vapors as is well understood and as is described in U.S. Pat. No. 5,717,564, which is hereby incorporated by reference in its entirety.

The flow meter 52 and valve 40 communicate through the vapor barrier 42 to a control system 48 that is typically positioned within the electronics compartment 46 of the fuel dispenser 14. Another example of a two-chambered fuel dispenser 14 is described in U.S. Pat. No. 4,986,445, which is hereby incorporated by reference in its entirety. The control system 48 may be a microcontroller, a microprocessor, or other electronics with associated memory and software programs running thereon as is well understood. The control system 48 typically controls other aspects of the fuel dispenser 14, such as the displays 26, 28, 30, 32 and the like, as is well understood.

The control system 48 directs the valve 40, via a valve communication line 50, to open and close when fuel dispensing is desired or not desired. The valve 40 may be a proportional solenoid controlled valve, such as described in U.S. Pat. No. 5,954,080 for example, which is incorporated herein by reference in its entirety. If the control system 48 directs the valve 40 to open to allow fuel to flow to be dispensed, the fuel enters the valve 40 and exits into the fuel flow meter 52. The volumetric flow rate of the fuel is measured by the fuel flow meter 52, and the fuel flow meter 52 communicates the volumetric flow rate of the fuel to the control system 48 via a pulser signal 54. In this manner, the control system 48 uses the pulser signal 54 to determine the volume of fuel flowing through the fuel dispenser and being delivered to a vehicle 12. The control system 48 updates the total gallons dispensed on the gallons display 30 via the gallons display communication line 56, and the price of fuel dispensed on the price display 32 via price display communication line 58.

Figure 3:
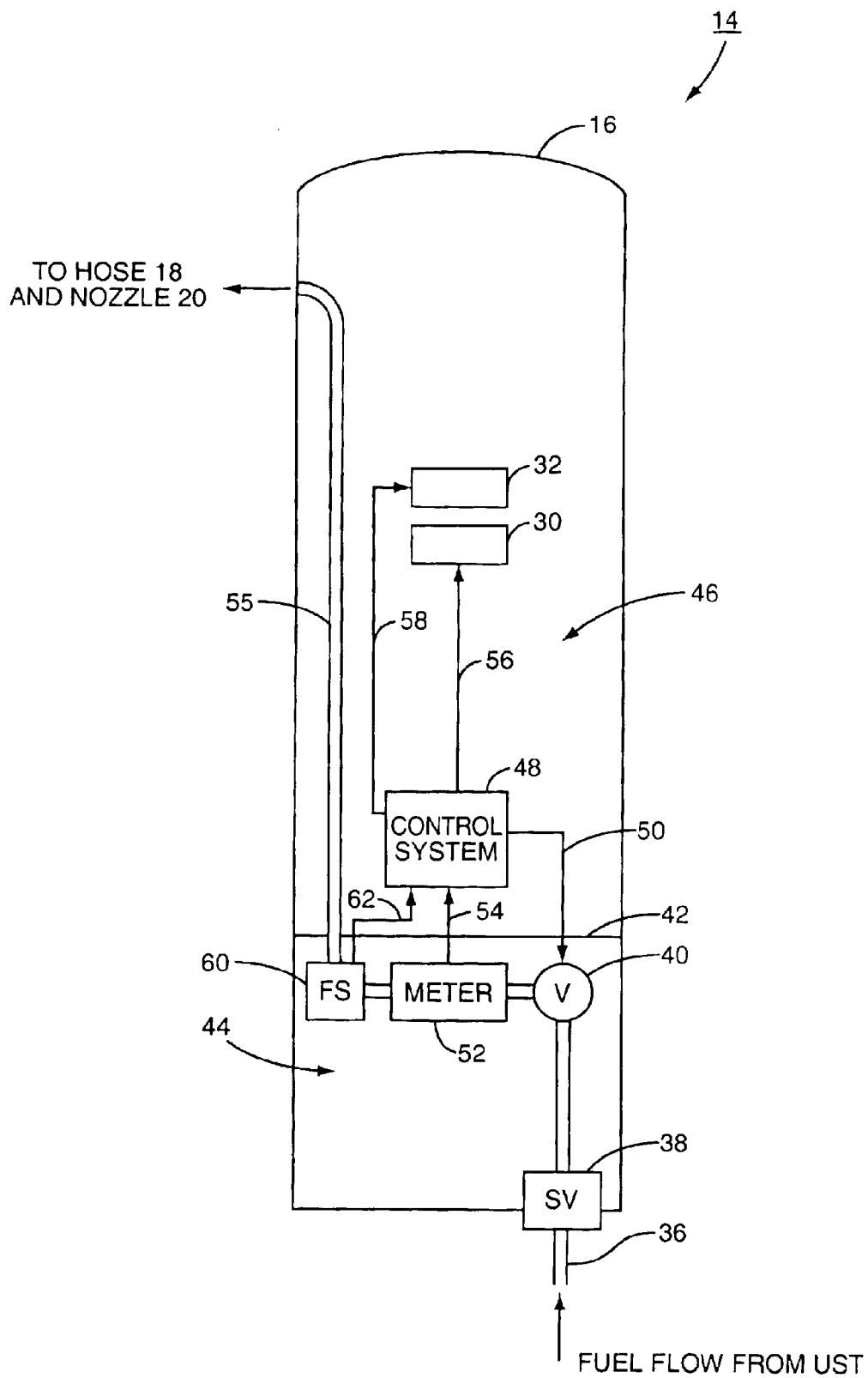
FIG. 3 illustrates a schematic diagram of a first embodiment of the fuel flow components of the fuel dispenser.

In the embodiment illustrated in FIG. 3, as fuel leaves the fuel flow meter 52, fuel enters a flow switch 60. The flow switch 60 generates a flow switch communication signal via the flow switch communication line 62 to the control system 48 to communicate when fuel is flowing through the fuel flow meter 52. After the fuel enters the flow switch 60, it exits through the fuel conduit 55 to be delivered to the hose 18 and nozzle 20 for eventual delivery into the fuel tank 24 of a vehicle 12. Although the control system 48 controls the opening and closing of valve 40 to allow fuel to flow or not flow, the control system 48 cannot guarantee that fuel is flowing through the fuel dispenser 14 just because the control system 48 has directed the valve 40 to be open.

If the fuel flow meter 52 continues to register volumetric flow of fuel via generation of the pulser signal 54 even after fuel flow has stopped, the control system 48, by receipt of the flow switch signal via flow switch communication line 62, will know whether fuel flow is indeed flowing through the fuel flow meter 52 or not. If fuel is not flowing through the fuel flow meter 52 even though the control system 48 is continuing to receive the pulser signal 54, the control system 48 can ignore the pulser signal 54 so that the number of gallons of fuel dispensed and the price of such fuel dispensed does not incorporate extraneous and erroneous additional pulses from the pulser signal 54. The remainder of this patent application will discuss more detailed aspects of the fuel flow switch 60 and its interaction with the control system 48 to allow the control system 48 to determine if fuel is flowing through the fuel dispenser 14 and to use this information to accurately measure fuel being dispensed to a vehicle 12.

Figure 4:
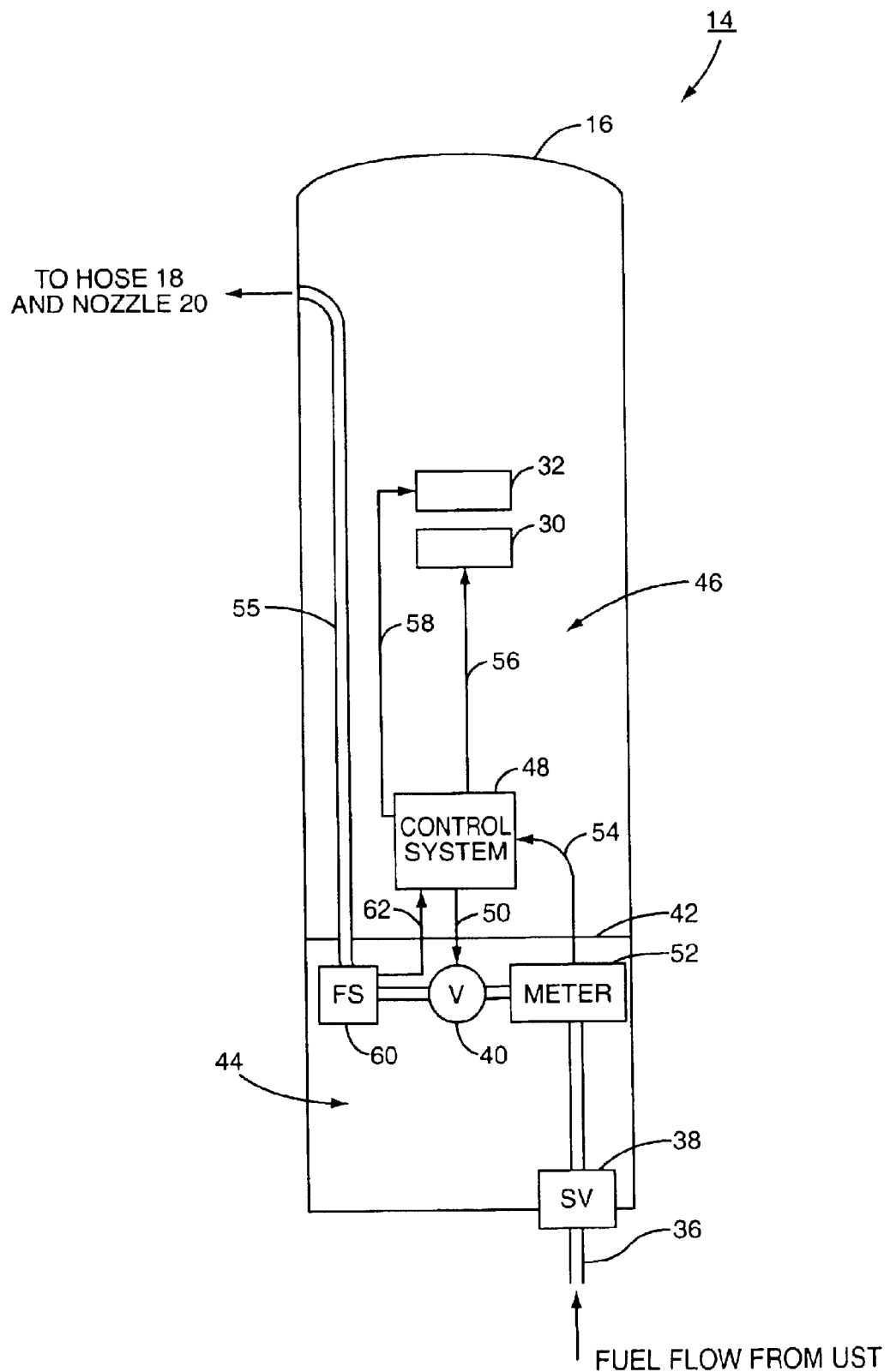
FIG. 4 illustrates a schematic diagram of a second embodiment of the fuel flow components of the fuel dispenser.

FIG. 4 is an illustration of a fuel dispenser 14 similar to that illustrated in FIG. 3. However, in FIG. 4, the fuel flow meter 52 and the valve 40 are rearranged. In FIG. 4 after fuel exits the shear valve 38, the fuel enters the fuel flow meter 52 first and then enters into the valve 40. This embodiment can also be used as well as the embodiment in FIG. 3 to perform the present invention. The control system 48 is still able to control fuel flow by the opening and closing of the valve 40 in this embodiment. Again, in this embodiment, the flow switch 60 is located downstream of the fuel flow meter 52 and valve 40 so that the control system 48 has knowledge of when fuel flow is actually occurring in the fuel dispenser and when it is not. Although not illustrated, the flow switch 60 could also be located on the inlet side of the fuel flow meter 52 either proximate to the fuel flow meter 52 or before other components on the inlet side of the fuel flow meter 52.

Figure 5:
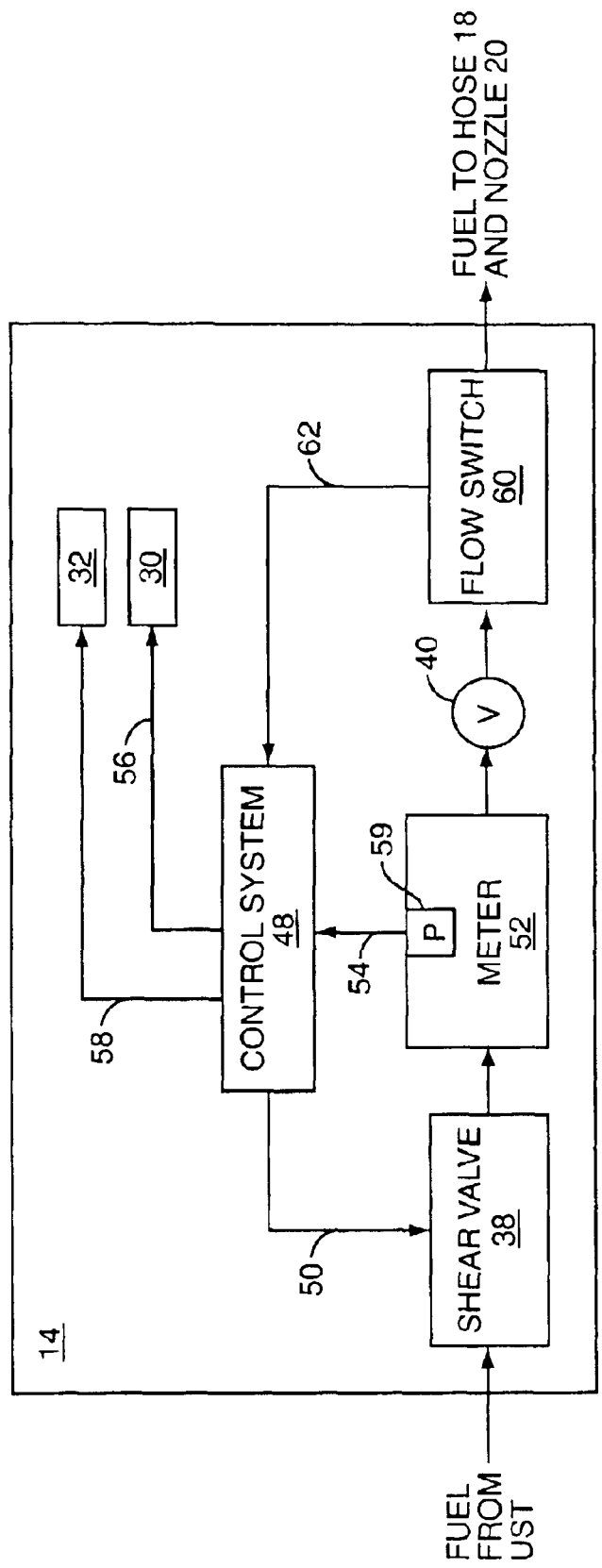
FIG. 5 illustrates a schematic diagram of the meter and flow switch according to one embodiment of the present invention.

FIG. 5 illustrates a block diagram of the present invention and of the components that are illustrated in FIG. 3. As previously discussed, the flow switch 60 indicates to the control system 48 when fuel is flowing through the fuel flow meter 52 and when it is not so that the control system 48 can ignore any extraneous and erroneous pulser signals 54. FIG. 5 illustrates the pulser 59 that generates the pulser signal 54 to the control system 48. The pulser 59 may be incorporated into the fuel flow meter 52, or may be external to the fuel flow meter 52. The other aspects of FIG. 5 are just as previously described above for FIG. 3.

Figure 6:
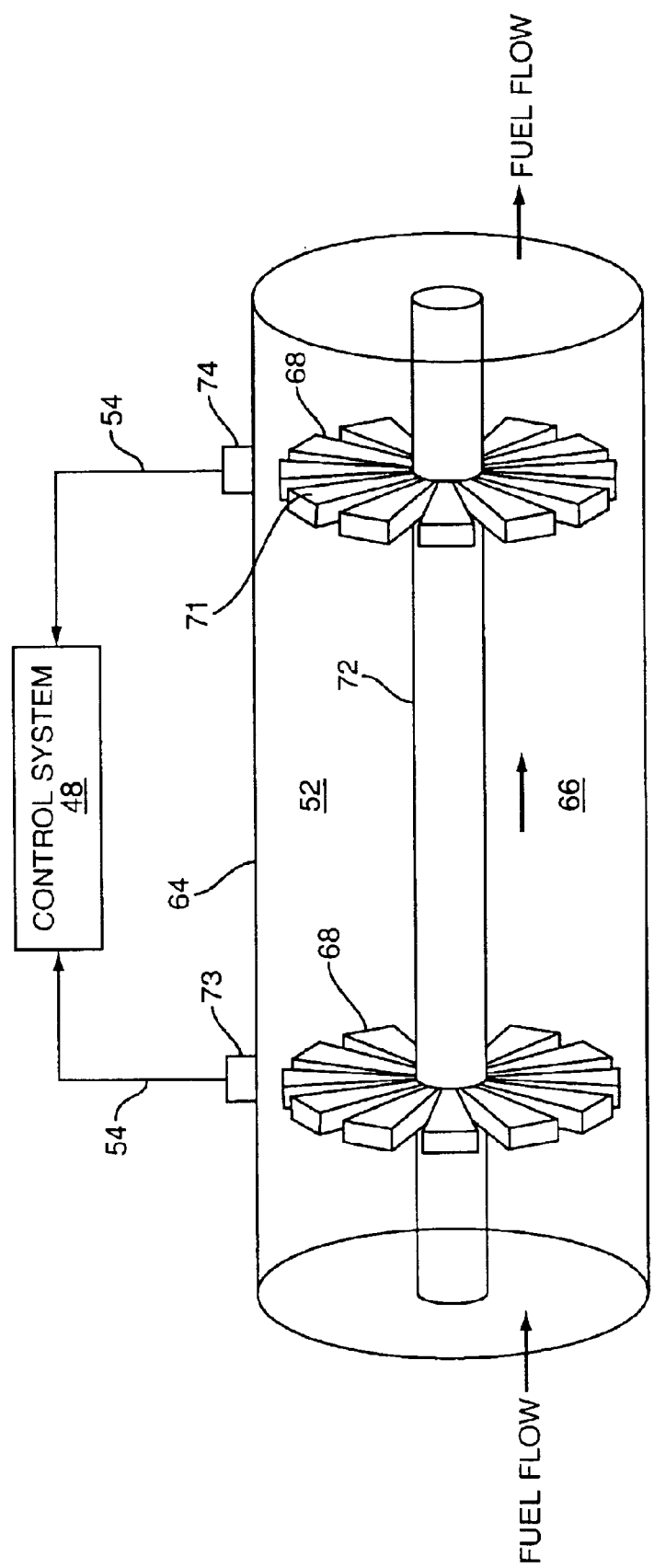
FIG. 6 illustrates a schematic diagram of a turbine flow meter that may be used as the fuel flow meter for the present invention.

FIG. 6 illustrates one particular type of fuel flow meter 52 that may be used in the present invention. This fuel flow meter 52 is called a "turbine" fuel flow meter 52. An example of a turbine fuel flow meter 52 is described in U.S. Pat. No. 5,689,071 previously referenced in the background of the invention above, and hereby incorporated by reference herein in its entirety. The turbine fuel flow meter 52 is comprised of a meter housing 64 that is typically constructed out of a high permeable material such as monel, a nickel-copper alloy, stainless steel, or 300-series non-magnetic stainless steel, for example. The meter housing 64 forms a cylindrical hollow shape that forms an inlet and outlet for fuel to flow through the turbine fuel flow meter 52. A shaft 72 is placed internal to the meter housing 64 to support one or more turbine rotors 70, 71. In the present example, two turbine rotors are illustrated; a first turbine rotor 70, and a second turbine rotor 71, but only one turbine rotor 70 may be used as well.

The turbine rotors 70, 71 rotate in an axis perpendicular to the axis of the shaft 72. The turbine rotors 70, 71 contain one or more vanes 68, also known as blades. As fuel passes through the inlet of the turbine fuel flow meter 52 and across the vanes 68 of the turbine rotors 70, 71, the turbine rotors 70, 71 and the vanes 68 rotate at a speed proportional to the rate of flow of the fuel flowing through the turbine fuel flow meter 52. The proportion of the rotational speed of the first turbine rotor 70 to the second turbine rotor 71 is determined by counting the vanes 68 passing by the pickoff coils 73, 74. The speed of the turbine rotors 70, 71 can be used to determine the flow rate of fuel passing through the turbine fuel flow meter 52, as is described in the aforementioned U.S. Pat. No. 5,689,071 and in U.S. Pat. No. 5,831,176, which are hereby incorporated by reference in their entireties.

In the present example, there are two pickoff coils—a first pickoff coil 73 placed proximate to the first turbine rotor 70, and a second pickoff coil 74 placed proximate to the second turbine rotor 71. It is noted that the turbine fuel flow meter 52 can be provided with only one turbine rotor 70 to detect flow rate as well. Also, the meter housing 64 may be comprised of two different permeable materials such as described in U.S. patent application Ser. No. 10/227,746 entitled "Multi-metal turbine sensing for increased sensitivity and reduced cost," incorporated herein by reference in its entirety.

The pickoff coils 73, 74 generate a magnetic signal that penetrates through the permeable meter housing 64 to reach the vanes 68. As the turbine rotors 70, 71 rotate, the vanes 68 superimpose a pulser signal 54 on the magnetic signal generated by the pickoff coils 73, 74. The pulser signal 54 is analyzed by the control system 48 to determine the speed of the vanes 68 that in turn can be used to calculate the flow rate and/or volume of fuel flowing through the turbine fuel flow meter 52. After fuel flow stops flowing through the turbine fuel flow meter 52, the turbine rotors 70, 71 may continue to rotate due to their rotational momentum. In this instance, the vanes 68 continue to superimpose a signal on the pick-off coils 73, 74 thereby generating pulser signals 54. These pulser signals 54 are communicated to the control system 48. The control system 48 will use the pulser signals 54 to determine the flow rate and/or volume of fuel erroneously since fuel was not flowing unless the control system 48 has a method of determining that fuel is not flowing during this time independent of the pulser signal 54. The flow switch 60 of the present invention accomplishes this function.

In the embodiment illustrated in FIG. 6, it should be noted that in an alternative embodiment of the present invention when only one turbine rotor 70 is used, only one pickoff coil 73 may be used as well. Also, more than one pickoff coil 73, 74 may be used for any one turbine rotor 70 so that the pickoff coils 73, 74 can determine the direction of the rotation of the turbine rotor 70 as well as its speed.

Figure 7A:
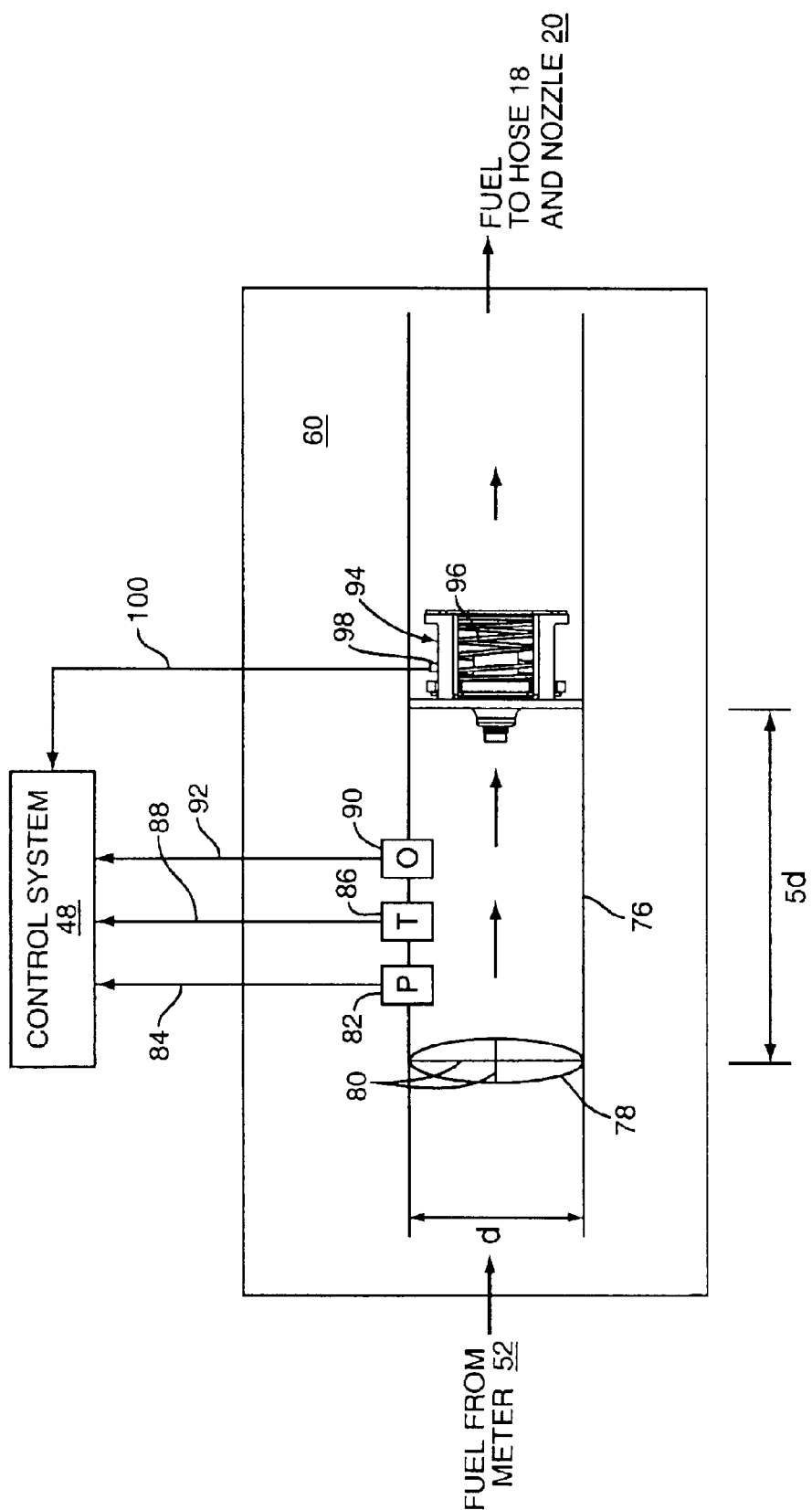
FIG. 7A illustrates a schematic diagram of one embodiment of a flow switch in accordance with one embodiment of the present invention.

FIG. 7A illustrates one embodiment of a flow switch 60 according to the present invention wherein the flow switch 60 is located downstream of the fuel flow meter 52. The flow switch 60 may be comprised of a housing 76, within which the components and various elements of the flow switch 60 are located, and also to create a fuel flow path for fuel to flow from the turbine fuel flow meter 52 and/or valve 40. As fuel enters the flow switch 60 from the left-hand side of FIG. 7, the fuel will first encounter a flow straightener 78. The flow straightener 78 in this embodiment is comprised of a cylindrical member with cross members 80. In this manner, as fuel flows across the flow straightener 78, it encounters the cross members 80 so that any turbulence in the fuel flow is minimized before the fuel reaches the other components of the flow switch 60. A flow straightener 78 is used to ensure that turbulence is minimized in the fuel flow to provide a consistent force of the fuel being applied to the flow switch 60, as will be later described. Typically, turbine flow meters in particular cannot handle turbulent flow conditions such as vortexes. Laminar flow conditions may be required, and the flow straightener 78 aids in providing such laminar flow conditions.

After fuel exits the flow straightener 78, it may encounter a pressure sensor 82, a temperature sensor 86, and/or an octane sensor 90. Inserting a flow straightener 78 on the inlet side of the flow switch 60 performs the function of inlet conditioning of the fluid if the fuel flow meter 52 is downstream of the valve 94. Optimal placement of the flow straightener 78 on the inlet side of the poppet valve 94 is a distance of approximately five times the internal diameter of the flow switch 60 fuel flow path noted as "d" in FIG. 7A from the poppet valve 94, but other distances may be used as designed and desired.

If a pressure sensor 82, temperature sensor 86, and/or octane sensor 90 are provided in a flow switch 60, these sensors are placed such that they are coupled to the internal fuel flow path of the flow switch 60. The pressure sensor 82, temperature sensor 86, and an octane sensor 90 are electronically coupled to the control system 48 via a pressure sensor communication line 84, a temperature sensor communication line 88, and an octane sensor communication line 92, respectively. In this manner, control system 48 can measure the pressure, temperature, and/or octane of the fuel flow for various reasons. The pressure inside the flow switch 60 may be used to determine pressure drop for system diagnostics purposes. The temperature of the fuel flowing through the flow switch 60 may be used by the control system 48 to determine the density and/or viscosity of the fuel for adjusting the volume throughput of fuel through the fuel flow meter 52, including but not limited to temperature compensation, and/or make corrections for thermal expansion of meter fuel flow meter 52. The octane of the fuel flow passing through the flow switch 60 may be used by the control system 48 to detect and alert octane variations and/or presence of wrong fuel in the line.

Next, after the fuel flow leaves the flow straightener 78, the fuel flow encounters a poppet valve 94 that is incorporated into the flow switch housing 76 and acts as the flow switch 60 in one embodiment of the present invention. The poppet valve 94 contains a spring 96 to form a spring-loaded housing such that the force of fuel flow applies pressure to the spring 96 and causes a sensor 98 coupled to the poppet valve 94 to generate a signal over a sensor communication line 100 to the control system 48. In this manner, the control system 48 detects when fuel is flowing through the flow switch 60 for the purposes previously described and later described in this application.

Figure 7B:
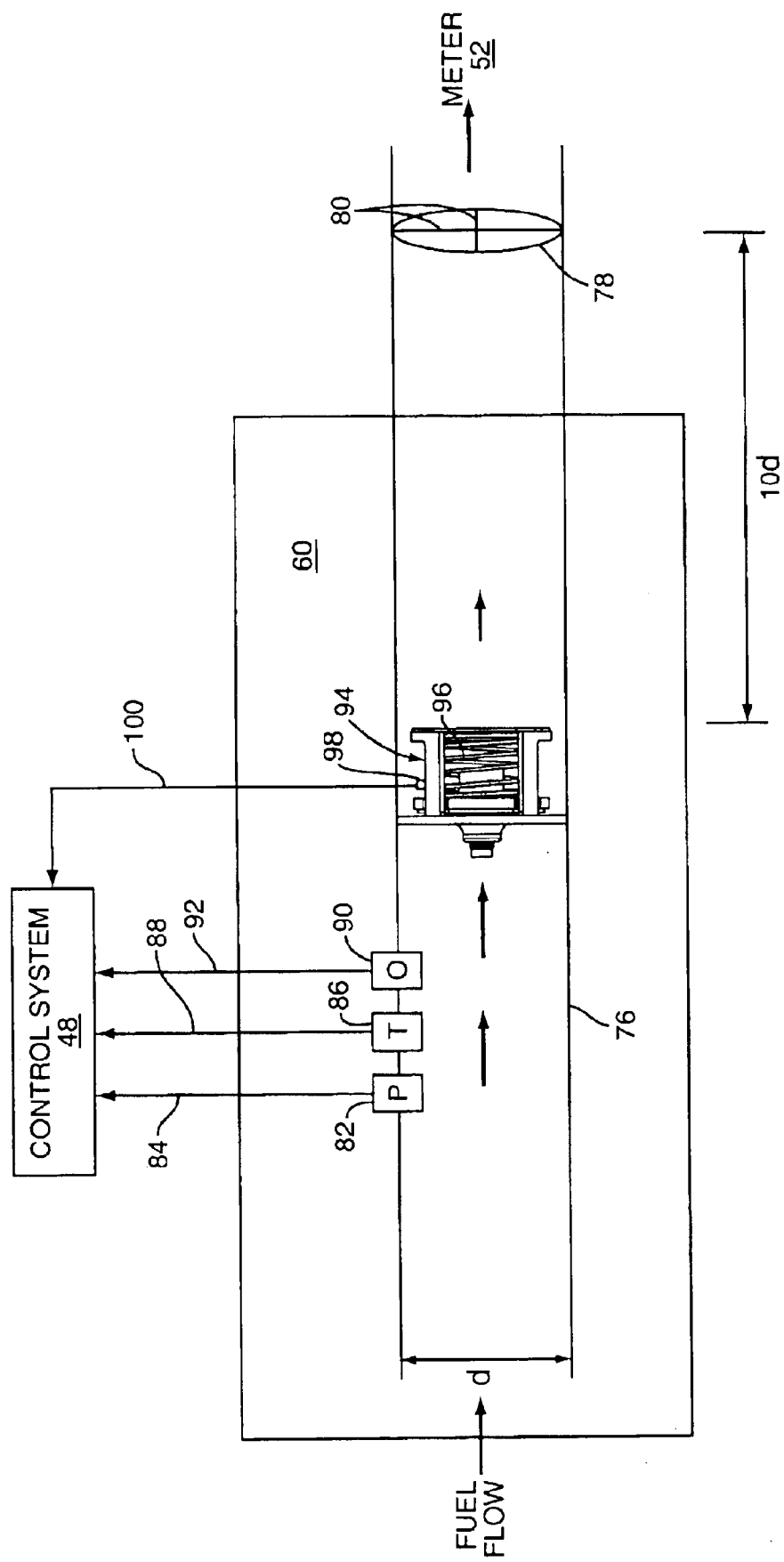
FIG. 7B illustrates a schematic diagram of another embodiment of a flow switch in accordance with one embodiment of the present invention.

FIG. 7B illustrates an alternative embodiment of the embodiment illustrated in FIG. 7A where the flow switch 60 is located upstream of the fuel flow meter 52. The discussion of FIG. 7A is equally applicable to this embodiment and is incorporated herein by reference in its entirety. In this embodiment, the flow straightener 78 is shown on the outlet side of the poppet valve 94, which also serves as a flow straightener 78 for the inlet of the fuel flow meter 52. The flow straightener 78 serves the same purposes as described above in FIG. 7A. Optimal placement of the flow straightener 78 on the outlet side of the poppet valve 94 is a distance of approximately ten times the internal diameter of the flow switch 60 fuel flow path noted as "d" in FIG. 7B from the poppet valve 94 to the inlet of the fuel flow meter 52, but other distances may be used as designed and desired.

Figure 8B:
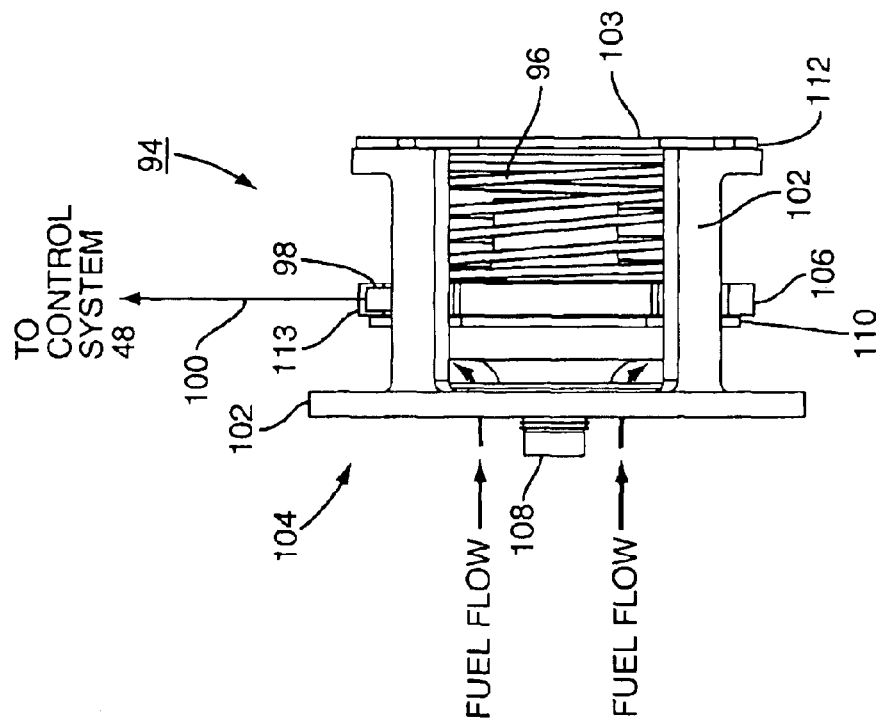
FIG. 8B illustrates a schematic diagram of a single poppet valve flow switch in an open position when fuel is flowing.
Figure 8A:
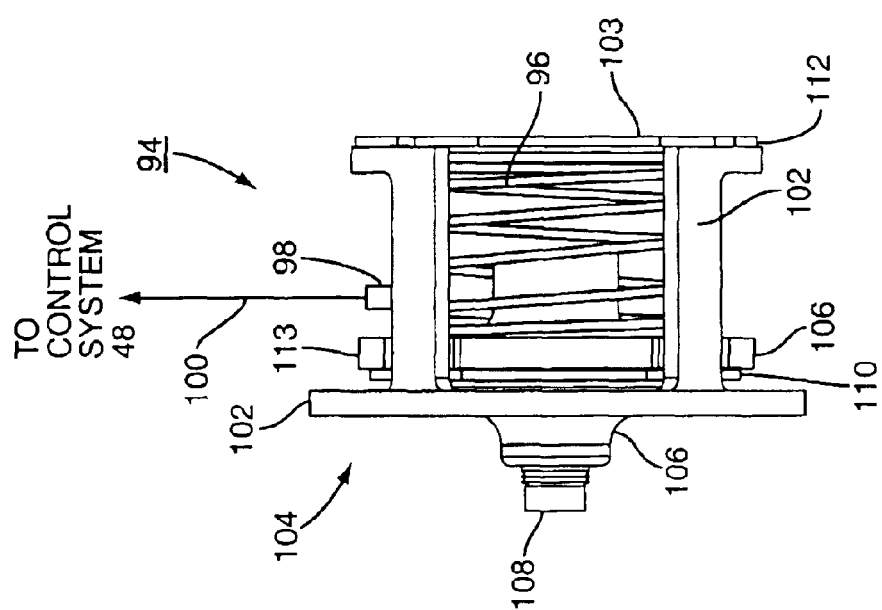
FIG. 8A illustrates a schematic diagram of a single poppet valve flow switch in a closed position when fuel is not flowing.
Figure 9:
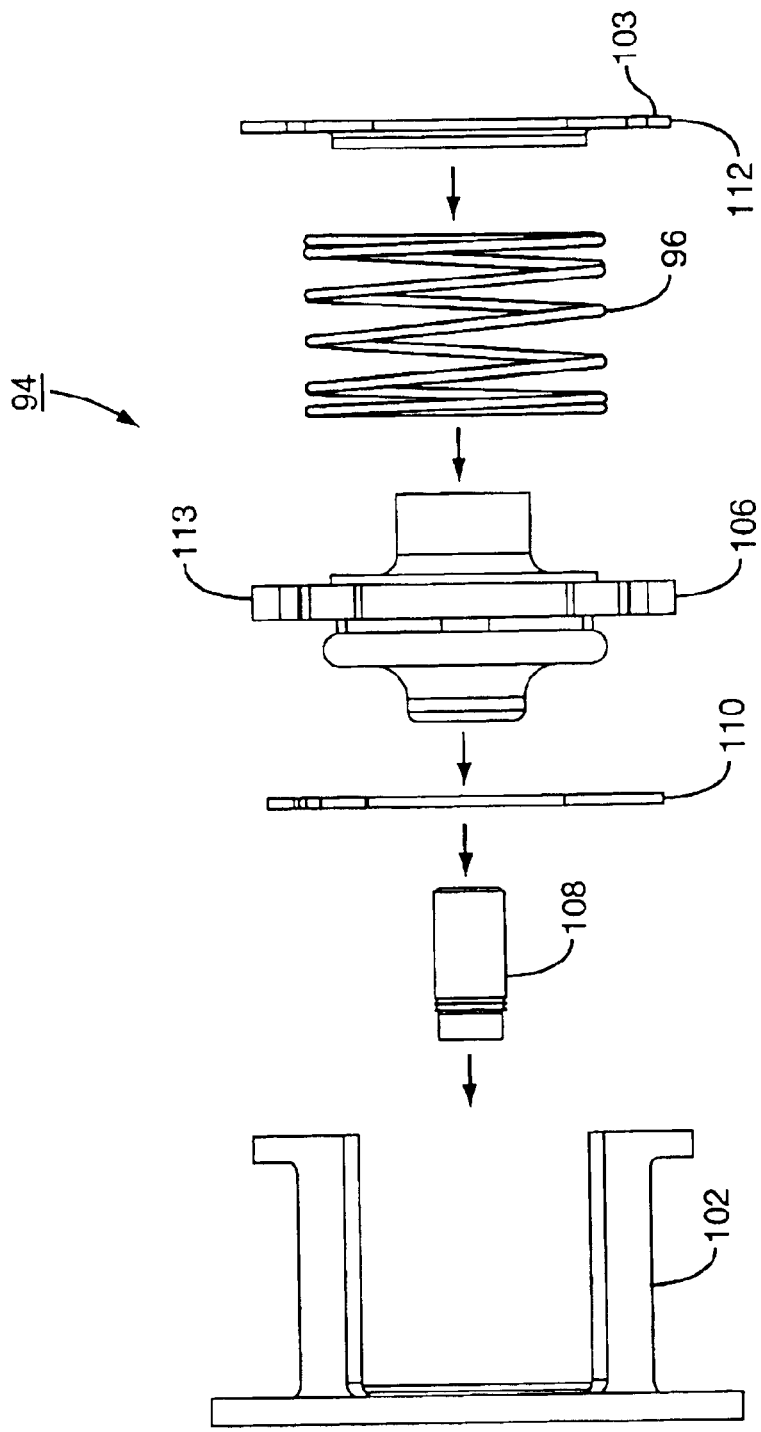
FIG. 9 illustrates an exploded view of the single poppet valve illustrated in FIGS. 8A and 8B and used at the flow switch in FIG. 7.

FIGS. 8A, 8B and 9 illustrate one embodiment of the flow switch 60 in the form of the poppet valve 94, as illustrated in FIG. 7. Please note that the present invention is not limited to any one particular design of a flow switch 60 and various other designs may be used with the present invention. The poppet valve 94 illustrated in FIG. 8A is comprised of a valve body 102 that forms a valve back 103. A piston 104 is located inside the valve body 102. A spring 96 is placed inside the valve body 102 between the valve back 103 and the piston 104 such that the piston 104 is spring loaded. The piston 104 contains a poppet head 106 that abuts the front of the valve body 102 separated by an o-ring 110 when the valve 94 is in a normally closed position. A washer 112 is also used to separate the spring 96 from the valve back 103. A relief valve 108 is also coupled to the poppet head 106 so that any significant back pressure on the valve 94 going from the valve back 103 towards the poppet head 106 can be relieved for safety considerations. A sensor 98 is placed on the valve body 102 and is electronically coupled to the control system 48 via the sensor communication line 100.

FIG. 8B shows the valve 94 in an open position when fuel is flowing. When fuel encounters the poppet head 106 and applies a force significant enough to compress the spring 96, the poppet head 106 is moved backwards and fuel flow is allowed to enter the valve body 102 and flow around the sides of the poppet head 106. Note that the width of the poppet head 106 is less than the diameter of the valve body 102 so that fuel can flow around the edges of the poppet head 106.

When the poppet head 106 moves back and encounters the same plane as where the sensor 98 is located on the valve body 102, the sensor 98 detects the poppet head 106 and sends a signal over the sensor communication line 100 to the control system 48. In this manner, the control system 48 knows that fuel is flowing due to the compression of the spring-loaded piston 104. In one embodiment, the sensor 98 is a Hall-Effect sensor 98, and the Hall-Effect sensor 98 detects a position sensible element 113 on the poppet head 106, which is a magnetic material in this case. The Hall-Effect sensor 98 detects the magnet in the position sensible element 113 and generates a signal over the sensor communication line 100 to the control system 48. The valve 94 also acts as a check valve to only allow fuel to flow in one direction thereby preventing backflow which can cause turbulence and inaccuracies in fuel flow measurement.

FIG. 9 illustrates an exploded view of the poppet valve 94 illustrated in FIGS. 6, 7, 8A and 8B. The exploded view is self-explanatory with the previous explanation of the components of the piston valve 94 described in FIGS. 8A and 8B.

Figure 10A:
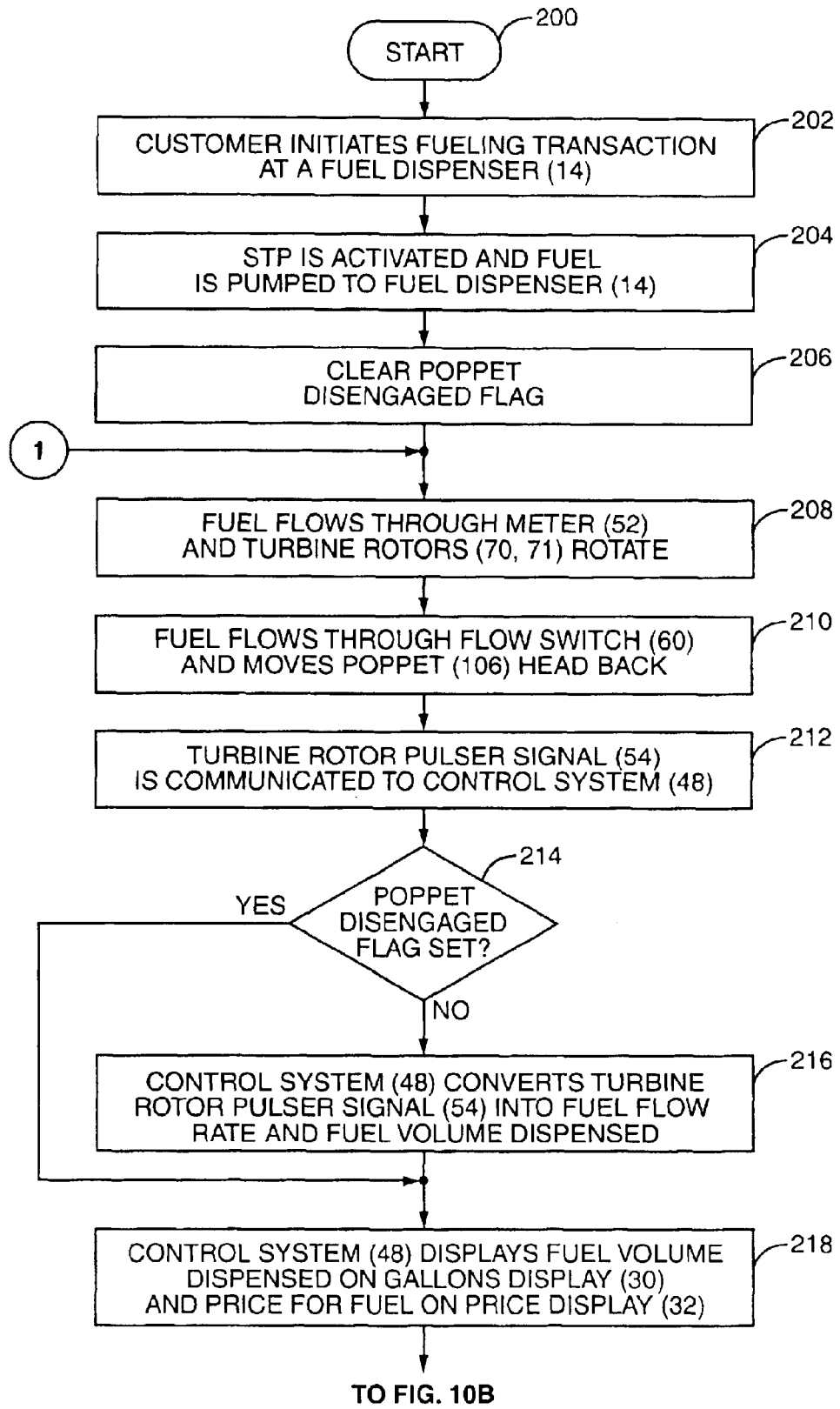
FIGS. 10A and 10B illustrate a flowchart diagram of one embodiment of the operation of the flow switch and control system to determine the flow rate and/or volume of fuel dispensed.
Figure 10B:
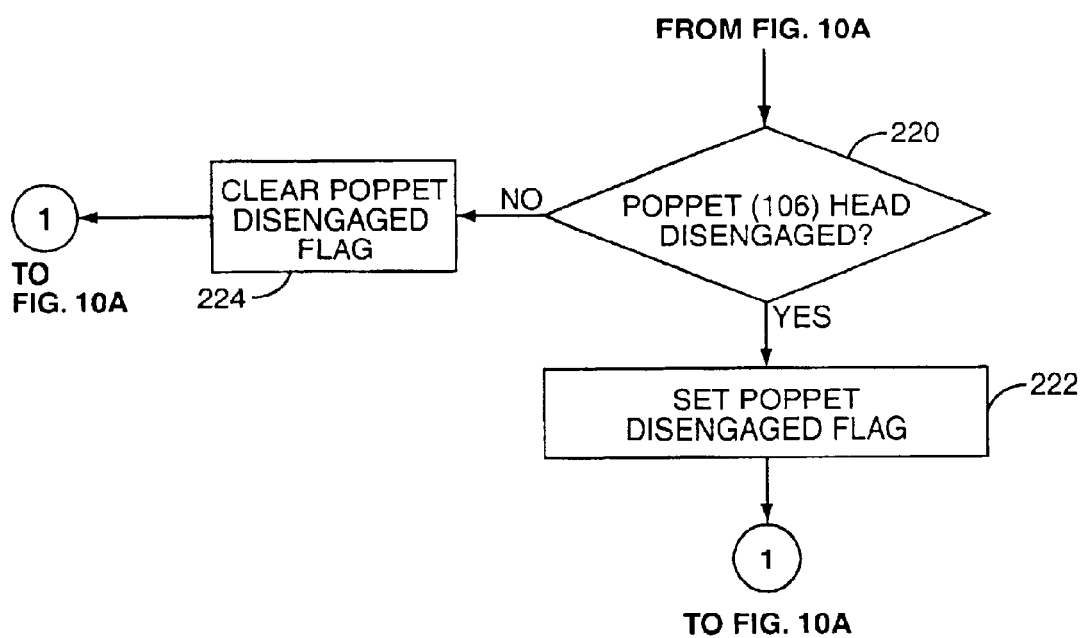

FIGS. 10A and 10B illustrate a flow chart that describes the operation of one embodiment of the present invention where the control system 48 uses the signal from the sensor communication line 100 to determine when fuel is flowing and to accurately determine the volume of fuel flowing through the fuel flow meter 52. The process starts (block 200), and the customer initiates a fueling transaction at a fuel dispenser 14 (block 202). Next, the submersible turbine pump is activated and fuel is pumped to the fuel dispenser 14 (block 204). The control system 48 clears a poppet disengaged flag in memory, since fuel flow from the STP has not yet reached the flow switch 60, to engage the flow switch 60. The control system 48 then releases the flow switch 60 when fuel flow has stopped (block 206).

Fuel then begins to flow through the fuel dispenser 14 where it enters the fuel flow meter 52 and the turbine rotors 70, 71 of the fuel flow meter 52. The turbine rotors 70, 71 begin to rotate as fuel passes through the fuel flow meter 52 (block 208). Fuel then flows through the flow switch 60, and the force of the fuel flow moves the poppet head 106 back (block 210). Next, the turbine rotor pulser signal 54 is communicated to the control system 48 indicative of fuel flow through the fuel flow meter 52 (block 212). The control system 48 will determine first before analyzing the pulser signal 54 if the poppet disengaged flag is set (decision 214). If the poppet disengaged flag is not set, the control system 48 will convert the turbine rotor pulser signal 54 into a fuel flow rate and fuel volume dispensed since this is indicative that fuel is flowing through the fuel flow meter 52 and flow switch 60 and the pulser signal 54 should not be ignored (block 216).

Next, whether it is from block 216 or the poppet disengaged flag sets being set in decision 214, the control system 48 displays the fuel volume dispensed in terms of gallons on the gallons display 30 and the price for such fuel on the price display 32 (block 218). The control system 48 determines if the poppet head 106 is disengaged via the sensor 98 and the sensor communication line 100 (decision 220, in FIG. 10B). If not, this indicates fuel flow slowing through the flow switch 60 and the poppet disengaged flag is cleared so that the control system 48 can continue to count pulses from the pulser signal 54 to determine the volume of fuel flow through the fuel flow meter 52 and the fuel dispenser 14 in block 208. If the poppet head 106 is disengaged in decision 220, the poppet disengaged flag is set (block 222) and the process repeats by going back to block 208. Note that, after the poppet disengaged flag is set in block 222, the next time the control system 48 performs the operation in decision 214, the poppet disengaged flag set decision will be answered in the affirmative which will cause the control system 48 to skip block 216 so that the turbine rotor pulser signal 54 is not used to determine the flow rate and/or volume of fuel dispensed since fuel is not flowing through the fuel flow meter 52.

Note that the flow chart illustrated in FIGS. 10A and 10B is just one embodiment of the present invention and is not intended to limit the operation of the present invention. The important function of the system, whoever it is accomplished, is the ability of the control system 48 to ignore pulser signals 54 when the flow switch 60 indicates to the control system 48 that fuel is not flowing.

Figure 11A:
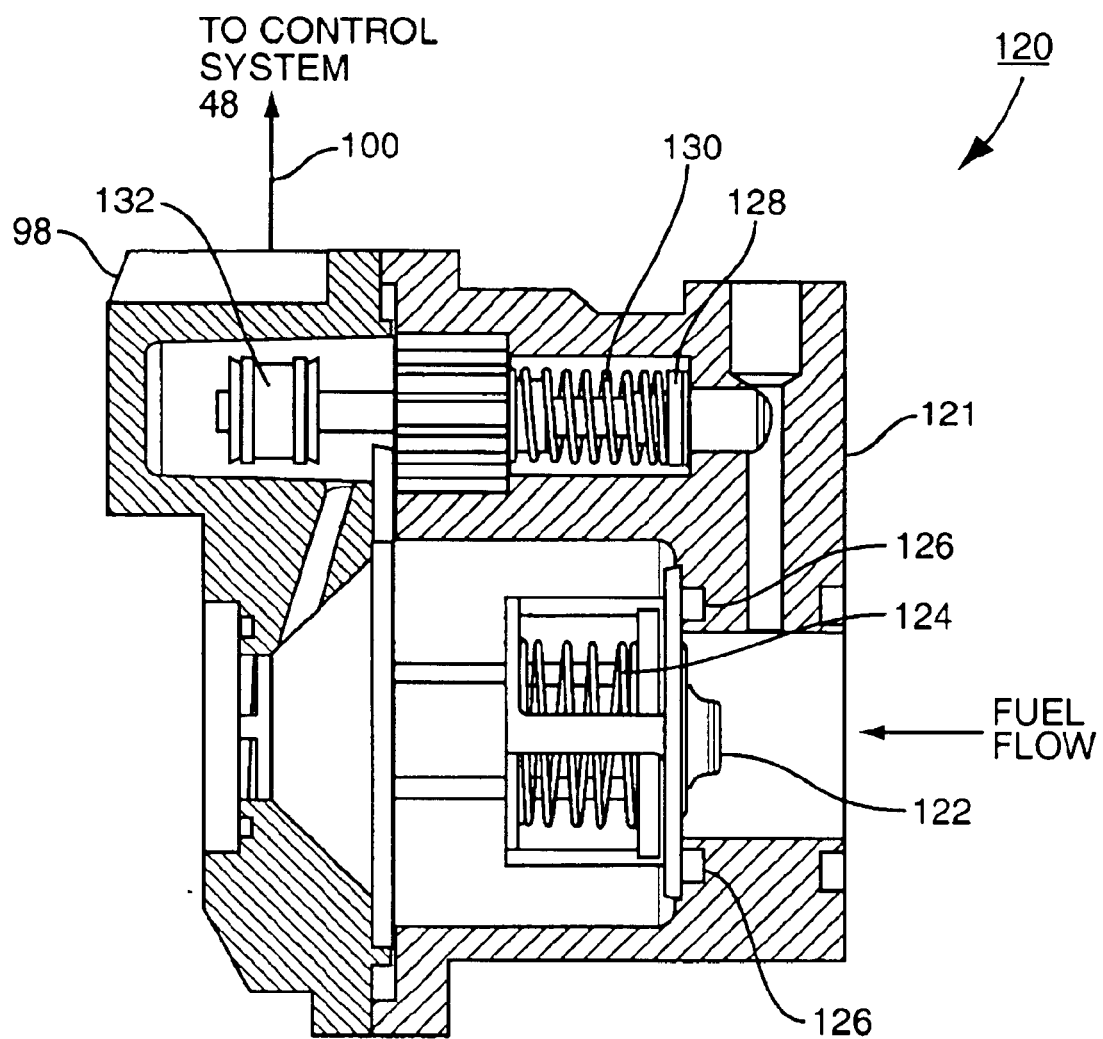
FIG. 11A illustrates a dual poppet embodiment of a flow switch in a first, closed position in accordance with another embodiment of the present invention.

FIG. 11A illustrates an alternative embodiment of a flow switch 60, which is generally referred to as a dual poppet valve 120 and which is also described in pending patent application Ser. No. 10/389,377, entitled "Dual Piston/Poppet Flow Switch." A dual poppet valve 120 may have an increased performance capability over the single poppet valve 94 due to slow flow and high flow conditions in a fuel dispenser 14 that also occurs in a "pre-pay"/"preset" fueling transaction. A fuel dispenser 14 typically includes a two-staged high flow and slow flow valve (not illustrated) so that fuel flow can be slowed down at the end of a preset transaction when the customer has dictated a set number of gallons or price to be paid for fuel. When the slow flow condition exists, the force from the fuel flow as applied to a single poppet valve 94 may not be enough force to move the poppet head 106 back so that the position sensible element 113 is detected by the sensor 98 such that the control system 48 detects that fuel is flowing. In this instance, fuel is flowing through the flow switch 60, but the control system 48 will not register fuel flow and will ignore the pulser signal 54 in the calculation of volume of fuel dispensed and the price charged to the customer, thereby resulting in an inaccurate fuel flow measurement. Therefore, it may be advantageous to design a flow switch 60 in the form of a dual poppet valve 120 that is capable of operating in both high flow and slow flow conditions.

The dual poppet valve 120 according to the embodiment illustrated in FIG. 11A is in a closed position so that no fuel flows through the dual poppet valve 120. The dual poppet valve 120 includes a housing 121 that is formed from a material that does not corrode in the presence of hydrocarbons or has been treated to avoid corrosion. A primary piston 122 is positioned within the housing 121. The primary piston 122 is held in its normally closed position by a primary spring 124. An o-ring 126 may be used to help ensure a tight seal between the primary piston 122 and the housing 121.

A secondary piston 128 is likewise present. The secondary piston 128 is held in its normally closed position by a secondary spring 130. The secondary piston 128 is positioned proximate to the housing 121 of the dual poppet valve 120 and is used to sense the position of the position sensible element 132. The sensor 98 communicates with the control system 48 to indicate the position of the secondary piston 128. In an exemplary embodiment, the position sensible element 132 is a magnet in the sensor 98 is a Hall-Effect sensor, like that previously described for the single poppet valve 94 illustrated in FIGS. 7–9. Alternative position sensible element 132/sensor 98 combinations include, but are not necessarily limited to: magnetic read switches, ultrasonic, in capacitive combinations.

The dual poppet valve 120 will be in the fully-closed position illustrated in FIG. 11A when no fuel is flowing. In a preferred embodiment, the force required to compress the secondary spring 130 is lower than the force required to compress the primary spring 124. Specifically, the secondary spring 130 is adapted to compress during a slow fuel flow condition, such as when the fuel dispenser 14 is operating in a slow flow mode. The primary spring 124 is adapted to compress during a high fuel flow condition, such as when the fuel dispenser 14 is operating in a high flow mode.

Figure 11B:
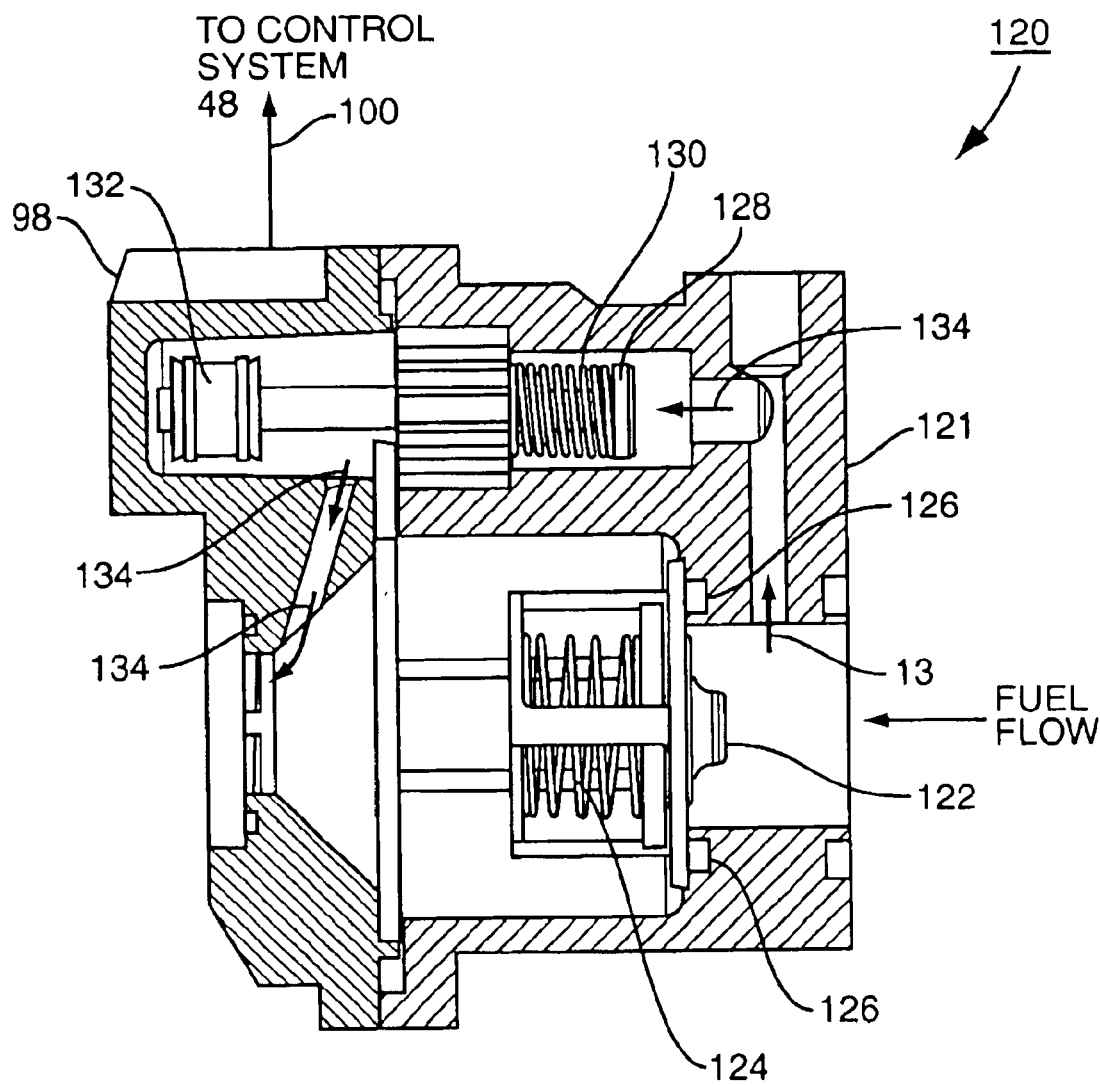
FIG. 11B illustrates the dual poppet flow switch illustrated in FIG. 11A in a second, partially open position.

The dual poppet valve 120 is illustrated in a partially open mode in FIG. 11B. As illustrated, the secondary spring 130 has compressed due to the pressure on the secondary piston 128. Compression of the secondary spring 130 opens the secondary or bypass fuel path noted variously by arrows 134. Additionally, the movement of the secondary piston 128 that compressed the secondary spring 130 causes the position sensible element 132 to move such that the sensor 98 detects the movement and sends a signal indicative of the movement to the control system 48 via the sensor communication line 100. The control system 48, upon receipt of the signal indicating movement of the position sensible element 132, begins accepting input from the fuel flow meter 52 and registering the flow of fuel through the fuel dispenser 14.

Figure 11C:
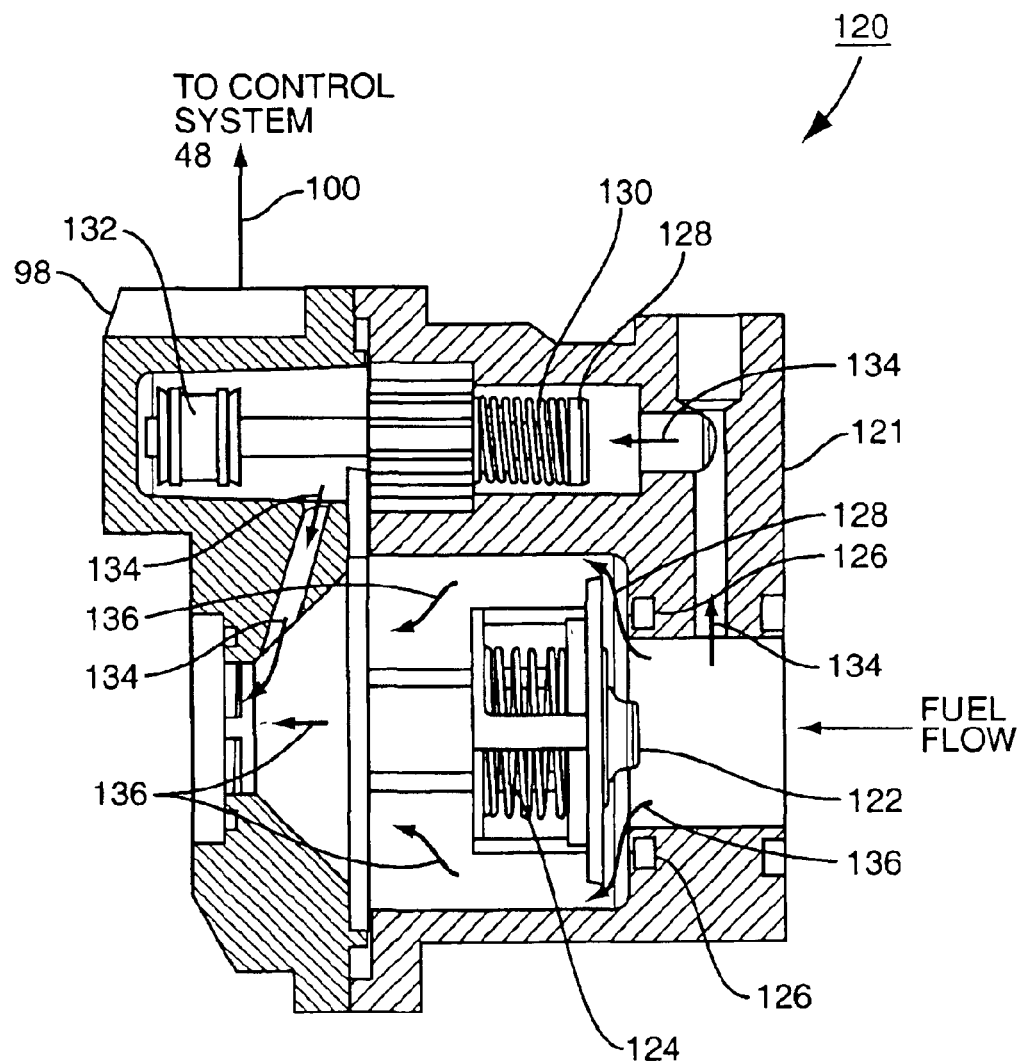
FIG. 11C illustrates the dual poppet flow switch illustrated in FIG. 11A in a third, fully open position.

The dual poppet valve 120 is illustrated in a fully open mode in FIG. 11C. When the fuel dispenser 14 is operating in a high flow mode, the fluid pressure builds up in the dual poppet valve 120 to the point where the primary spring 124 is forced to compress. This opens the primary fuel path shown variously by arrows 136 and allows fuel to flow through the fuel dispenser 14 at a high flow rate. The valve 120 also acts as a check valve to only allow fuel to flow in one direction thereby preventing backflow which can cause turbulence and inaccuracies in fuel flow measurement.

Figure 12A:
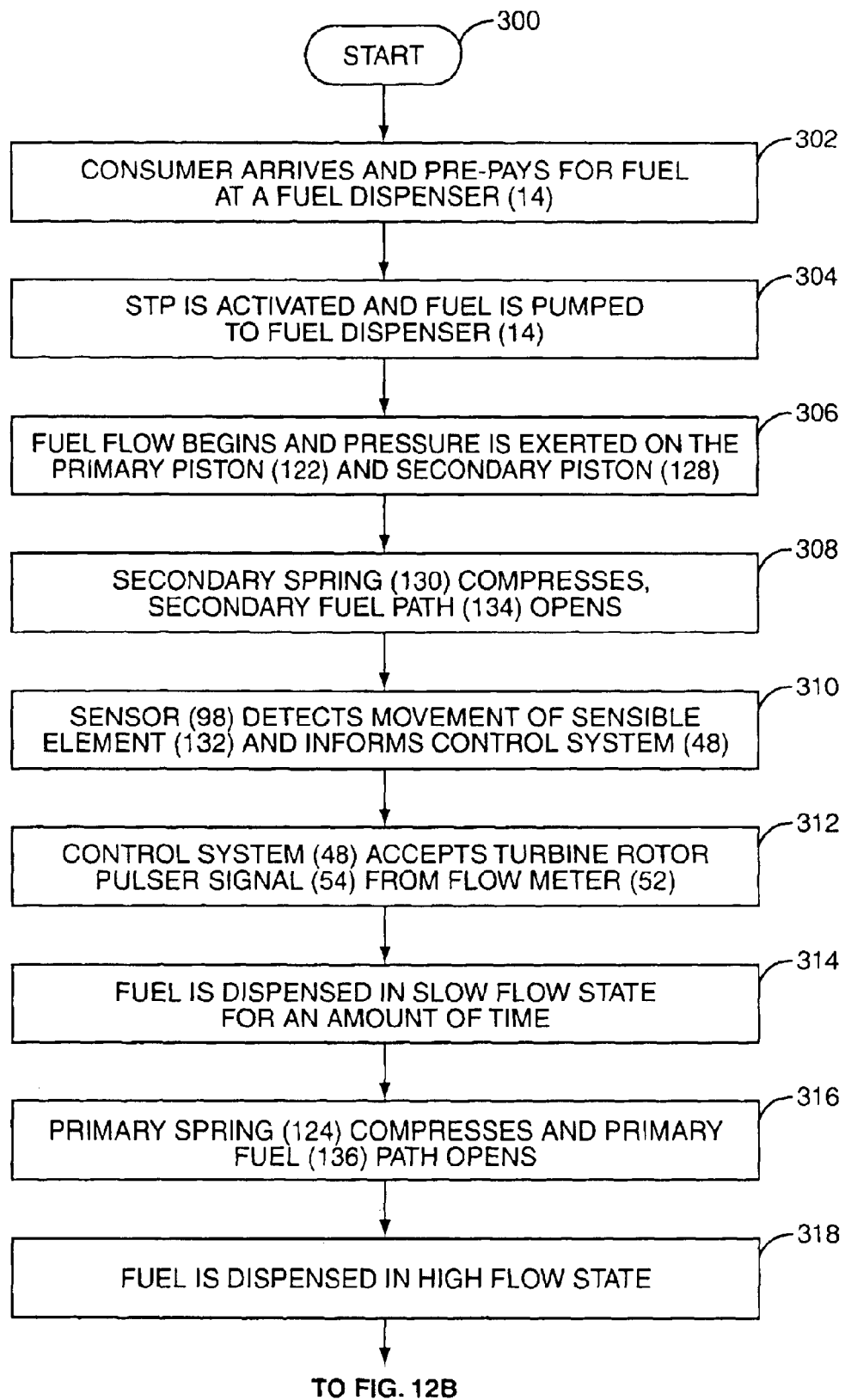
FIGS. 12A and 12B illustrate a flowchart diagram of another embodiment of the operation of the flow switch and control system to determine the flow rate and/or volume of fuel dispensed using the flow switch illustrated in FIGS. 11A–11C.
Figure 12B:
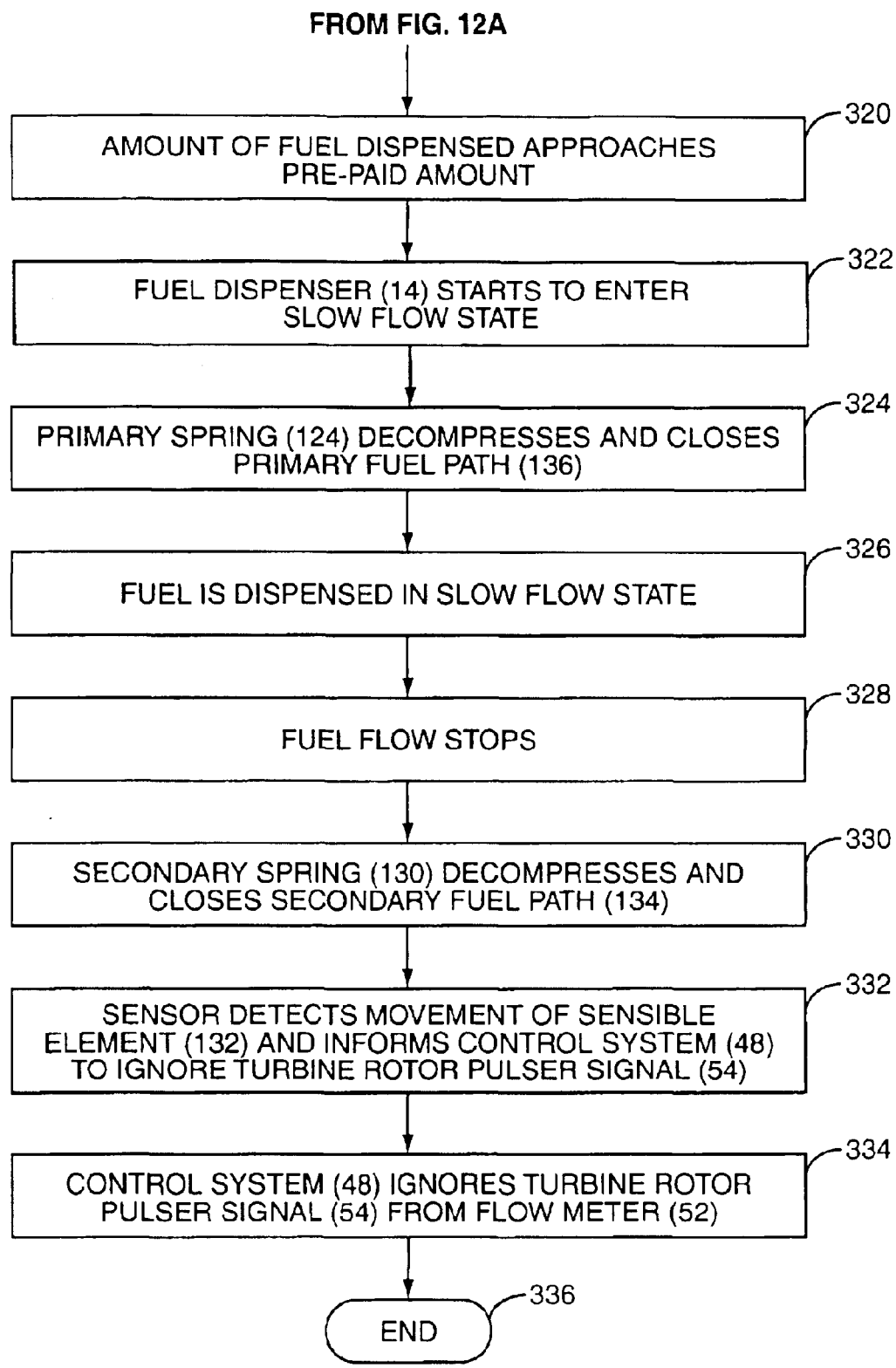

The use of the dual poppet valve 120 is also explained with reference to the flow charts in FIGS. 12A and 12B in the example of a customer "pre-pay." The process starts (block 300) and the customer arrives and prepays for fuel at a fuel dispenser 14 (block 302). The STP is activated, and fuel is pumped to the fuel dispenser 14 (block 304). When fuel flow begins flowing in response to a consumer inserting the nozzle 20 into the fill neck 22 of the vehicle 12 and initiating fuel flow, fuel flow through the fuel dispenser 14 exerts pressure on the primary piston 122 and the secondary piston 128 (block 306). Next, since the amount of pressure exerted by the fuel flow is relatively low, only the secondary spring 130 compresses and the secondary fuel path 134 is opened (block 308). As the secondary fuel path 134 opens, the position sensible element moves and is detected by the sensor 98, which reports the movement to the control system 48 via the sensor communication line 100 (block 310). The control system 48 begins accepting the pulser signal 54 from the fuel flow meter 52 (block 312). Fuel is then dispensed at a slow flow state in the fuel dispenser 14 (block 314). Slow flow rates range typically between zero and two gallons per minute (gpm) and preferably approximately 0.25 gpm.

After a small amount of time on the order of five seconds or less, the fuel dispenser 14 enters into a high flow state. This allows more fuel to flow through the fuel dispenser 14 to the dual poppet valve 120. The volume of fuel is now great enough to exert sufficient pressure on the primary piston 122 to cause the primary spring 124 to compress, thereby opening the primary fuel path 136 (blocks 316 and 318). In due course, the amount of fuel that the fuel dispenser has dispensed will approach that paid for by the prepayment of block 302 over in FIG. 8B (block 320). As the transaction nears completion, the fuel dispenser starts to enter a slow flow mode (block 322). For example, if the consumer paid ten dollars as a prepaid amount for fuel, the fuel dispenser 14 may start to enter a slow flow state when the amount of fuel dispensed reaches nine dollars and eighty cents ($9.80), for example. This slows the amount and volume of fuel that reaches the dual poppet valve 120, thereby reducing the pressure against the primary and secondary pistons 122, 128. As the pressure has been reduced on the primary piston 122, the primary spring 124 decompresses and closes the primary fuel path 136 (block 324). Next, the fuel dispenser 14 enters the slow flow state to finalize the delivery of fuel to the vehicle 12 to equal the amount prepaid by the customer (block 326).

The consumer may continue to squeeze the handle on the nozzle 20 as the final ounces of fuel are dispensed into the fuel neck 22 in slow flow state. Once the prepaid amount of fuel has been dispensed, the fuel dispenser 14 directs fuel flow to stop (block 328). This stops the flow of fuel to the dual poppet valve 120 thereby reducing the pressure on the primary and secondary pistons 122, 128. With no pressure on the secondary piston 128, the secondary spring 130 decompresses and closes the secondary fuel path 134 (block 330). The sensor 98 detects the movement of the position sensible element 132 and informs the control system 48 to ignore pulser signal 54 (block 332). The control system 48 then stops accepting input from the fuel flow meter 52 via the pulser signal 54 so that erroneous pulser signals are not counted in the volume and price of fuel dispensed by the fuel dispenser 14 (block 334) and the process ends (block 336).

Those skilled in the art will recognize improvements and modifications to the preferred embodiments of the present invention. All such improvements and modifications are considered within the scope of the concepts disclosed herein and the claims that follow.

What is claimed is:

1. A flow measurement system that measures the volume of a fluid, comprising:
    a control system;
    a turbine meter, comprising:
        a meter flow path;
        at least one turbine rotor in said meter flow path that rotates when fluid passes through said meter flow path; and
        a pulser that sends a pulser signal in relation to the rotation of said at least one turbine rotor to said control system;
    a flow switch, comprising:
        a flow switch flow path; and
        a sensor that communicates a flow switch signal to said control system when fluid is passing through said flow switch flow path;
        said flow switch flow path fluidly coupled to said meter flow path such that fluid that passes through said meter flow path also passes through said flow switch flow path;
    said control system receives said pulser signal and calculates a volume of the fluid passing through said meter flow path based on said pulser signal, wherein said control system ignores said pulser signals in the calculation of the volume of the fluid passing through said meter flow path when said control system is not receiving said flow switch signal.

2. The system of claim 1, wherein said flow switch is located upstream of said turbine meter.

3. The system of claim 1, wherein said flow switch is located downstream of said turbine meter.

4. The system of claim 1, wherein said flow switch further comprises:
    a housing; and
    a primary fuel flow path positioned within said housing comprising:
        a piston; and
        a spring holding said piston in a normally closed position.

5. The system of claim 4, wherein said sensor is adapted to sense movement of said piston and report movement of said piston to said control system by communicating said flow switch signal to said control system.

6. The system of claim 5, wherein said piston further comprises a position sensible element.

7. The system of claim 6, wherein said position sensible element comprises a magnet and said sensor comprises a Hall-Effect sensor.

8. The system of claim 7, wherein said sensor comprises an element selected from the group consisting of: a magnetic reed switch arrangement, a capacitive sensor, an ultrasonic sensor, and a Hall-Effect sensor.

9. The system of claim 4, further comprising a relief valve positioned within said housing.

10. The system of claim 9, wherein said relief valve is associated with said piston.

11. The system of claim 1, wherein said flow switch is comprised of:

a valve body;

a poppet head;

an o-ring;

a relief valve wherein said relief valve is coupled between said valve body and said o-ring and wherein said o-ring is coupled between said relief valve and said poppet head;

a washer; and a spring coupled between said poppet head and said washer;

said poppet head adapted to compress said spring towards said washer when a force is applied to the side of said poppet head coupled to said o-ring.

12. The system of claim 1, wherein said flow switch further comprises:

a housing;

a primary fuel flow path positioned within said housing comprising:
  a primary piston; and
  a primary spring holding said primary piston in a normally closed position;

a secondary fuel flow path positioned within said housing, fluidly connected to said primary fuel flow path and passing around said primary piston, said secondary fuel flow path comprising:
  a secondary piston; and
  a secondary spring holding said secondary piston in a normally closed position, said secondary spring requiring less force to compress than said primary spring.

13. The system of claim 12, wherein said sensor is adapted to sense movement of said secondary piston and report movement of said secondary piston to said control system.

14. The system of claim 13, wherein said secondary piston further comprises a position sensible element.

15. The system of claim 14, wherein said position sensible element comprises a magnet and said sensor comprises a Hall-Effect sensor.

16. The system of claim 15, wherein said sensor comprises an element selected from the group consisting of: a magnetic reed switch arrangement, a capacitive sensor, an ultrasonic sensor, and a Hall-Effect sensor.

17. The system of claim 12, further comprising a relief valve positioned within said housing.

18. The system of claim 17, wherein said relief valve is associated with said primary piston.

19. The system of claim 1, further comprising a temperature sensor fluidly coupled to said a flow switch flow path and coupled to said control system wherein said temperature sensor senses the temperature of the fuel passing through said meter path and communicates the temperature to said control system.

20. The system of claim 19, wherein said control system adjusts the calculation of said volume of the fluid passing through said meter flow path based on the temperature of the fluid.

21. The system of claim 1, further comprising a pressure sensor fluidly coupled to said a flow switch flow path and coupled to said control system wherein said pressure sensor senses the pressure in the flow switch flow path and communicates the temperature to said control system.

22. The system of claim 21, wherein said control system adjusts the calculation of said volume of the fluid passing through said meter flow path based on the pressure of the fluid.

23. The system of claim 1, further comprising a viscosity sensor fluidly coupled to said a flow switch flow path and coupled to said control system wherein said viscosity sensor measures the viscosity of the fluid passing through said meter flow path and communicates the viscosity to said control system.

24. The system of claim 23, wherein said control system adjusts the calculation of said volume of the fluid passing through said meter flow path based on the viscosity of the fluid.

25. The system of claim 1, further comprising an octane sensor fluidly coupled to said a flow switch flow path and coupled to said control system wherein said octane sensor to determine the octane of the fluid passing through said meter flow path and communicates the octane to said control system.

26. The system of claim 25, wherein said control system determines if the meter flow path is contaminated based on the octane of the fluid.

27. A fuel dispenser that measures the volume of fuel dispensed into a vehicle, comprising:

a control system;

a fuel conduit that is fluidly coupled to fuel;

a valve coupled to said control system and coupled to said fuel conduit wherein said control system controls the opening and closing of said valve to control the flow of fuel;

a turbine meter coupled to said fuel conduit, comprising:
  a meter flow path;
  at least one turbine rotor in said flow path that rotates when fuel passes through said flow path; and
  a pulser that sends a pulser signal in relation to the rotation of said at least one turbine rotor to said control system;

a flow switch coupled to said fuel conduit, comprising:
  a flow switch flow path; and
  a sensor that sends a flow switch signal to said control system when fuel is passing through said flow switch flow path;
  said flow switch flow path fluidly coupled to said meter flow path such that fuel that passes through said meter flow path also passes through said flow switch flow path;

said control system receives said pulser signal and calculates a volume of the fuel passing through said meter flow path based on said pulser signal, wherein said control system ignores said pulser signals in the calculation of the volume of the fuel passing through said meter flow path when said control system is not receiving said flow switch signal.

28. The fuel dispenser of claim 27, wherein said flow switch is located upstream of said turbine meter.

29. The fuel dispenser of claim 27, wherein said flow switch is located downstream of said turbine meter.

30. The fuel dispenser of claim 27, wherein said flow switch further comprises:

a housing; and a primary fuel flow path positioned within said housing comprising:
  a piston; and
  a spring holding said piston in a normally closed position.

31. The fuel dispenser of claim 30, wherein said sensor is adapted to sense movement of said piston and report movement of said piston to said control system by communicating said flow switch signal to said control system.

32. The fuel dispenser of claim 31, wherein said piston further comprises a position sensible element.

33. The fuel dispenser of claim 32, wherein said position sensible element comprises a magnet and said sensor comprises a Hall-Effect sensor.

34. The fuel dispenser of claim 33, wherein said sensor comprises an element selected from the group consisting of: a magnetic reed switch arrangement, a capacitive sensor, an ultrasonic sensor, and a Hall-Effect sensor.

35. The fuel dispenser of claim 30, further comprising a relief valve positioned within said housing.

36. The fuel dispenser of claim 35, wherein said relief valve is associated with said piston.

37. The fuel dispenser of claim 27, wherein said flow switch is comprised of:
   a valve body;
   a poppet head;
   an o-ring;
   a relief valve wherein said relief valve is coupled between said valve body and said o-ring and wherein said o-ring is coupled between said relief valve and said poppet head;
   a washer; and
   a spring coupled between said poppet head and said washer;
   said poppet head adapted to compress said spring towards said washer when a force is applied to the side of said poppet head coupled to said o-ring.

38. The fuel dispenser of claim 27, wherein said flow switch further comprises:
   a housing;
   a primary fuel flow path positioned within said housing comprising:
      a primary piston; and
      a primary spring holding said primary piston in a normally closed position;
   a secondary fuel flow path positioned within said housing, fluidly connected to said primary fuel flow path and passing around said primary piston, said secondary fuel flow path comprising:
      a secondary piston; and
      a secondary spring holding said secondary piston in a normally closed position, said secondary spring requiring less force to compress than said primary spring.

39. The fuel dispenser of claim 38, wherein said sensor is adapted to sense movement of said secondary piston and report movement of said secondary piston to said control system.

40. The fuel dispenser of claim 39, wherein said secondary piston further comprises a position sensible element.

41. The fuel dispenser of claim 40, wherein said position sensible element comprises a magnet and said sensor comprises a Hall-Effect sensor.

42. The fuel dispenser of claim 41, wherein said sensor comprises an element selected from the group consisting of: a magnetic reed switch arrangement, a capacitive sensor, an ultrasonic sensor, and a Hall-Effect sensor.

43. The fuel dispenser of claim 38, further comprising a relief valve positioned within said housing.

44. The fuel dispenser of claim 43, wherein said relief valve is associated with said primary piston.

45. The fuel dispenser of claim 27, further comprising a temperature sensor fluidly coupled to said a flow switch flow path and coupled to said control system wherein said temperature sensor senses the temperature of the fuel passing through said meter path and communicates the temperature to said control system.

46. The fuel dispenser of claim 45, wherein said control system adjusts the calculation of said volume of the fuel passing through said meter flow path based on the temperature of the fuel.

47. The fuel dispenser of claim 27, further comprising a pressure sensor fluidly coupled to said a flow switch flow path and coupled to said control system wherein said pressure sensor senses the pressure in the flow switch flow path and communicates the temperature to said control system.

48. The fuel dispenser of claim 27, wherein said control system adjusts the calculation of said volume of the fuel passing through said meter flow path based on the pressure of the fuel.

49. The fuel dispenser of claim 27, further comprising a viscosity sensor fluidly coupled to said a flow switch flow path and coupled to said control system wherein said viscosity sensor measures the viscosity of the fuel passing through said meter flow path and communicates the viscosity to said control system.

50. The fuel dispenser of claim 49, wherein said control system adjusts the calculation of said volume of the fuel passing through said meter flow path based on the viscosity of the fuel.

51. The fuel dispenser of claim 27, further comprising an octane sensor fluidly coupled to said a flow switch flow path and coupled to said control system wherein said octane sensor to determine the octane of the fuel passing through said meter flow path and communicates the octane to said control system.

52. The fuel dispenser of claim 51, wherein said control system determines if the meter flow path is contaminated based on the octane of the fuel.

53. The fuel dispenser of claim 27, wherein said control system displays the volume of the fuel on a display.

54. The fuel dispenser of claim 27, wherein said control system calculates a price to be charged for the fuel and wherein said control system displays the price on a price display.

55. A method of determining the volume of a fluid, comprising the steps of:
   passing the fluid through across at least one turbine rotor in a turbine meter causing said at least one turbine rotor to rotate;
   generating a pulser signal in response to the rotation of said turbine rotor;
   passing the fluid through a flow switch;
   generating a flow switch signal only in response to fluid passing through said flow switch; and
   using said pulser signal to calculate the volume of the fluid based on the rate of said pulser signal if said flow switch signal is generated in said step of generating a flow switch signal.

56. The method of claim 55, wherein said step of generating a flow switch signal comprises sensing the movement of a piston in a flow switch housing that moves in response to fluid passing through said flow switch housing.

57. The method of claim 56, further comprising:
   sensing movement of said piston; and
   reporting movement of said piston to a control system by communicating said flow switch signal to said control system.

58. The method of claim 57, wherein said step of sensing said piston comprises sensing a position sensible element on said piston.

59. The method of claim 56, further comprising releasing a relief valve in said flow switch housing if said flow switch becomes over-pressurized.

60. The method of claim 55, further comprising sensing the temperature of the fluid and using the temperature of the fluid to adjust the calculation of the volume of the fluid.

61. The method of claim 55, further comprising sensing the pressure inside said flow switch housing and using the pressure inside said flow switch housing to adjust the calculation the volume of the fluid.

62. The method of claim 55, further comprising sensing the viscosity of the fluid and using the viscosity of the fluid to adjust the calculation of the volume of the fluid.

63. The method of claim 55, further comprising sensing the octane of the fluid and using the octane of the fluid to determine if any contamination is pressure in said turbine meter.

64. A method of determining the volume of fuel dispensed into a vehicle, comprising the steps of:
passing fuel across at least one turbine rotor in a turbine meter causing said at least one turbine rotor to rotate;
generating a pulser signal in response to the rotation of said turbine rotor;
passing the fuel through a flow switch;
generating a flow switch signal only in response to fuel passing through said flow switch;
using said pulser signal to calculate the volume of the fuel based on the rate of said pulser signal if said flow switch signal is generated in said step of generating a flow switch signal; and
displaying the volume of the fuel dispensed on a volume display.

65. The method of claim 64, wherein said step of generating a flow switch signal comprises sensing the movement of a piston in a flow switch housing that moves in response to fluid passing through said flow switch housing.

66. The method of claim 65, further comprising:
sensing movement of said piston; and
reporting movement of said piston to a control system by communicating said flow switch signal to said control system.

67. The method of claim 66, wherein said step of sensing said piston comprises sensing a position sensible element on said piston.

68. The method of claim 65, further comprising releasing a relief valve in said flow switch housing if said flow switch becomes over-pressurized.

69. The method of claim 64, further comprising sensing the temperature of the fluid and using the temperature of the fluid to adjust the calculation of the volume of the fluid.

70. The method of claim 64, further comprising sensing the pressure inside said flow switch housing and using the pressure inside said flow switch housing to adjust the calculation the volume of the fluid.

71. The method of claim 64, further comprising sensing the viscosity of the fluid and using the viscosity of the fluid to adjust the calculation of the volume of the fluid.

72. The method of claim 64, further comprising sensing the octane of the fluid and using the octane of the fluid to determine if any contamination is pressure in said turbine meter.

73. A method of determining the volume of fuel dispensed into a vehicle, comprising the steps of:
initiating the dispensing of fuel;
opening partially a two-stage valve adapted to regulate fuel flow into a flow rate selected from the group consisting of: no flow, slow flow and high flow;
measuring the flow rate of the fuel;
generating pulser signals indicative of the flow rate of the fuel;
compressing a secondary spring in a secondary piston in a dual piston valve to open a secondary fuel path;
detecting movement of a sensible element in said dual piston valve when said secondary piston moves;
communicating the movement of said secondary piston;
using said pulser signal to calculate the volume of the fuel based on the rate of said pulser signal;
dispensing the fuel in a slow flow state;
opening fully said two-stage valve;
compressing a primary spring in a primary piston in said dual piston valve to open a primary fuel path;
dispensing the fuel in a high flow state;
closing partially said two-stage valve when the volume of the fuel approaches a pre-paid amount;
decompressing said primary spring to close same primary fuel path;
closing said two-stage valve;
decompressing said secondary spring to close said secondary fuel path;
communicating a movement of said sensible element after said step of decompressing; and
ignoring said pulser signal after said steps of decompressing and communicating a movement of said sensible element to said control system after said step of decompressing.

* * * * *

UNITED STATES PATENT AND TRADEMARK OFFICE
CERTIFICATE OF CORRECTION

PATENT NO. : 6,935,191 B2 Page 1 of 1
DATED : August 30, 2005
INVENTOR(S) : Paul D. Olivier, William P. Shermer and Seifollah S. Nanaji It is certified that error appears in the above-identified patent and that said Letters Patent is hereby corrected as shown below:

Column 15,
Lines 50 and 60, change "said a flow" to -- said flow --.

Column 16,
Lines 2 and 12, change "said a flow" to -- said flow --.

Column 17,
Line 66, change "said a flow" to -- said flow --.

Column 18,
Lines 9, 17 and 27, change "said a flow" to -- said flow --.
Line 43, change "through across" to -- across --.

Column 19,
Line 10, insert -- of -- after "calculation".
Line 16, change "pressure" to -- present --.

Column 20,
Line 10, change "pressure" to -- present --.

Signed and Sealed this

First Day of November, 2005

JON W. DUDAS
*Director of the United States Patent and Trademark Office*